(12) United States Patent
Jung

(10) Patent No.: US 11,146,749 B2
(45) Date of Patent: Oct. 12, 2021

(54) IMAGE SENSOR, ELECTRONIC SYSTEM INCLUDING THE SAME, AND METHOD OF OPERATING THE SAME

(71) Applicant: SAMSUNG ELECTRONICS CO., LTD., Suwon-si (KR)

(72) Inventor: Seung-Hoon Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 378 days.

(21) Appl. No.: 16/213,450

(22) Filed: Dec. 7, 2018

(65) Prior Publication Data

US 2019/0281247 A1 Sep. 12, 2019

(30) Foreign Application Priority Data

Mar. 7, 2018 (KR) .......................... 10-2018-0026645

(51) Int. Cl.
*H04N 5/3745* (2011.01)
*H04N 5/374* (2011.01)

(52) U.S. Cl.
CPC ....... *H04N 5/37452* (2013.01); *H04N 5/3742* (2013.01); *H04N 5/37455* (2013.01)

(58) Field of Classification Search
CPC ............. H04N 5/37452; H04N 5/3742; H04N 5/37455; H04N 5/374; H04N 5/378
See application file for complete search history.

(56) References Cited

U.S. PATENT DOCUMENTS

| | | | |
|---|---|---|---|
| 7,570,293 B2 | 8/2009 | Nakamura | |
| 8,169,498 B2 | 5/2012 | Yamashita | |
| 8,208,055 B2 * | 6/2012 | Hiyama | ................ H03M 1/06 348/300 |
| 8,339,495 B2 | 12/2012 | Sugai et al. | |
| 8,451,361 B2 | 5/2013 | Yamashita | |
| 8,692,177 B2 | 4/2014 | Kasuga et al. | |
| 8,817,153 B2 | 8/2014 | Bahukhandi et al. | |
| 8,970,758 B2 | 3/2015 | Yamashita | |

(Continued)

FOREIGN PATENT DOCUMENTS

| | | |
|---|---|---|
| JP | 4827627 | 9/2011 |
| JP | 5163184 | 12/2012 |

(Continued)

*Primary Examiner* — Lin Ye
*Assistant Examiner* — John H Morehead, III
(74) *Attorney, Agent, or Firm* — F. Chau & Associates, LLC

(57) ABSTRACT

An image sensor includes a pixel array, an analog-to-digital conversion block, and an output block. The pixel array includes a plurality of unit pixels and generates a plurality of analog pixel signals in response to incident light. The analog-to-digital conversion block includes a plurality of analog-to-digital converters that are connected to a plurality of columns of the pixel array and convert the plurality of analog pixel signals into a plurality of digital signals. The output block includes a plurality of output circuits that are connected to the plurality of analog-to-digital converters and control output timings of the plurality of digital signals. Each of the plurality of output circuits is connected to two or more output lines to simultaneously output two or more bits of a digital signal among the plurality of digital signals.

19 Claims, 15 Drawing Sheets

(56) References Cited

U.S. PATENT DOCUMENTS

| | | | |
|---|---|---|---|
| 9,819,891 B2 | 11/2017 | Lee et al. | |
| 2008/0258042 A1* | 10/2008 | Krymski | H04N 3/155 250/208.1 |
| 2009/0109315 A1* | 4/2009 | Taura | H03M 1/56 348/311 |
| 2011/0202310 A1* | 8/2011 | Min | G01S 17/10 702/166 |
| 2012/0212657 A1* | 8/2012 | Mo | H04N 5/3658 348/300 |
| 2013/0070135 A1* | 3/2013 | Bahukhandi | H04N 5/3742 348/300 |
| 2015/0256778 A1* | 9/2015 | Kusaka | G02B 7/346 348/302 |
| 2015/0350585 A1* | 12/2015 | Kim | H03M 1/1014 348/308 |
| 2017/0085812 A1 | 3/2017 | Nam et al. | |
| 2018/0205886 A1* | 7/2018 | Lee | H04N 5/3698 |

FOREIGN PATENT DOCUMENTS

| | | |
|---|---|---|
| JP | 5264095 | 5/2013 |
| JP | 5481221 | 2/2014 |
| KR | 10-1653228 | 8/2016 |

\* cited by examiner

IMAGE SENSOR, ELECTRONIC SYSTEM INCLUDING THE SAME, AND METHOD OF OPERATING THE SAME

CROSS-REFERENCE TO RELATED APPLICATION

This application claims priority under 35 U.S.C. § 119 to Korean Patent Application No. 10-2018-0026645, filed on Mar. 7, 2018 in the Korean Intellectual Property Office (KIPO), the disclosure of which is incorporated by reference herein in its entirety.

TECHNICAL FIELD

Exemplary embodiments of the inventive concept relate generally to image sensors, and more particularly, to image sensors, electronic system including the image sensors, and methods of operating the image sensors.

DISCUSSION OF RELATED ART

A complementary metal oxide semiconductor (CMOS) image sensor is an image pickup device manufactured using CMOS processes. A CMOS image sensor has lower manufacturing cost, smaller pixel size, and lower power consumption than a charge coupled device (CCD) image sensor having a high-voltage analog circuit. In addition, with the improvement of the performance of CMOS image sensors, CMOS image sensors are widely used for mobile electronic devices such as smartphones, tablet personal computers (PCs), digital cameras, etc. To implement a CMOS image sensor with high speed and high resolution, the CMOS image sensor may have an analog-to-digital converter (ADC) with high speed and a large number of unit pixels. Degradation of dark shading or black shading characteristics in conventional CMOS image sensors may fail to meet ever-increasing noise standards.

SUMMARY

According to an exemplary embodiment of the inventive concept, an image sensor includes a pixel array, an analog-to-digital conversion block, and an output block. The pixel array includes a plurality of unit pixels and generates a plurality of analog pixel signals in response to incident light. The analog-to-digital conversion block includes a plurality of analog-to-digital converters that are connected to a plurality of columns of the pixel array and convert the plurality of analog pixel signals into a plurality of digital signals. The output block includes a plurality of output circuits that are connected to the plurality of analog-to-digital converters and control output timings of the plurality of digital signals. Each of the plurality of output circuits is connected to two or more output lines to simultaneously output two or more bits of a digital signal among the plurality of digital signals.

According to an exemplary embodiment of the inventive concept, an electronic system includes an image sensor and a controller. The image sensor generates a plurality of digital signals in response to incident light. The controller controls an operation of the image sensor. The image sensor includes a pixel array, an analog-to-digital conversion block, and an output block. The pixel array includes a plurality of unit pixels and generates a plurality of analog pixel signals in response to the incident light. The analog-to-digital conversion block includes a plurality of analog-to-digital converters that are connected to a plurality of columns of the pixel array and convert the plurality of analog pixel signals into the plurality of digital signals. The output block includes a plurality of output circuits that are connected to the plurality of analog-to-digital converters and control output timings of the plurality of digital signals. Each of the plurality of output circuits is connected to two or more output lines to simultaneously output two or more bits of a digital signal among the plurality of digital signals.

According to an exemplary embodiment of the inventive concept, in a method of operating an image sensor including a pixel array including a plurality of unit pixels, a plurality of analog pixel signals are generated in response to incident light. The plurality of analog pixel signals are converted into a plurality of digital signals. Output timings of the plurality of digital signals are controlled in response to a plurality of read enable signals such that two or more bits of a digital signal to be output among the plurality of digital signals are simultaneously output via two or more output lines connected to one column among a plurality of columns of the pixel array.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
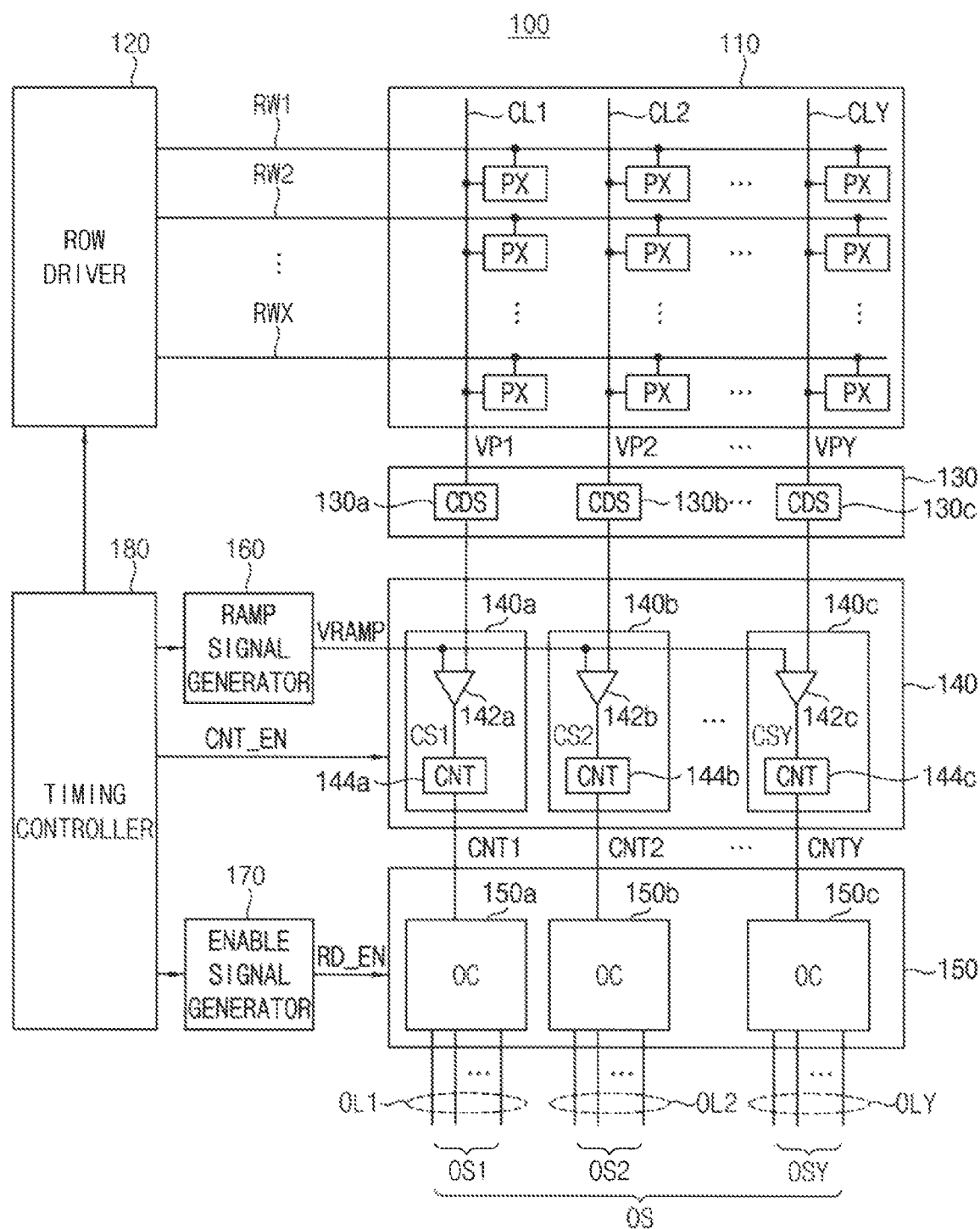
FIG. 1 is a block diagram illustrating an image sensor according to an exemplary embodiment of the inventive concept.

Exemplary embodiments of the inventive concept provide an image sensor capable of preventing degradation of dark shading or black shading characteristics.

Exemplary embodiments of the inventive concept also provide an electronic system including the image sensor.

Exemplary embodiments of the inventive concept further provide a method of operating the image sensor.

Exemplary embodiments of the inventive concept will be described more fully hereinafter with reference to the accompanying drawings. Like reference numerals may refer to like elements throughout this application.

FIG. 1 is a block diagram illustrating an image sensor according to an exemplary embodiment of the inventive concept.

Referring to FIG. 1, an image sensor 100 includes a pixel array 110, an analog-to-digital conversion (ADC) block 140, and an output block 150. The image sensor 100 may further include a row driver 120, a correlated double sampling (CDS) block 130, a ramp signal generator 160, an enable signal generator 170, and a timing controller 180.

In exemplary embodiments of the inventive concept, the image sensor 100 may be classified as a front side illumination (FSI) image sensor or a back side illumination (BSI) image sensor depending on whether a light receiving surface is the front or back side of a substrate.

The pixel array 110 includes a plurality of unit pixels PX that are arranged in a matrix formation. Each of the plurality of unit pixels PX may be connected to a respective one of a plurality of rows RW1, RW2, . . . , RWX and a respective one of a plurality of columns CL1, CL2, . . . , CLY, where each of X and Y is a natural number greater than or equal to two. The pixel array 110 generates a plurality of analog pixel signals VP1, VP2, . . . , VPY based on incident light. A configuration and an operation of each unit pixel PX will be described with reference to FIG. 13.

The row driver 120 may be connected to the plurality of rows RW1~RWX of the pixel array 110. The row driver 120 may generate driving signals to drive the plurality of rows RW1~RWX. For example, the row driver 120 may drive the plurality of unit pixels PX included in the pixel array 110 row by row.

The correlated double sampling block 130 may include a plurality of correlated double sampling circuits (CDSs) 130a, 130b, . . . , 130c. The plurality of correlated double sampling circuits 130a~130c may be connected to the plurality of columns CL1~CLY of the pixel array 110. The plurality of correlated double sampling circuits 130a~130c may perform a correlated double sampling operation on the plurality of analog pixel signals VP1~VPY output from the pixel array 110. For example, the first correlated double sampling circuit 130a may be connected to the first column CL1 and may perform a correlated double sampling operation on the first analog pixel signal VP1 output from the first column CL1.

The analog-to-digital conversion block 140 includes a plurality of analog-to-digital converters 140a, 140b, . . . , 140c. The plurality of analog-to-digital converters 140a~140c are connected to the plurality of columns CL1~CLY of the pixel array 110 via the plurality of correlated double sampling circuits 130a~130c. The plurality of analog-to-digital converters 140a~140c perform a column analog-to-digital conversion operation that converts the plurality of analog pixel signals VP1~VPY (e.g., a plurality of correlated double sampled analog pixel signals output from the plurality of correlated double sampling circuits 130a~130c) into a plurality of digital signals CNT1, CNT2, . . . , CNTY in parallel (e.g., simultaneously or concurrently). For example, the first analog-to-digital converter 140a may be connected to the first column CL1 via the first correlated double sampling circuit 130a and may convert the first analog pixel signal VP1 (e.g., the correlated double sampled first analog pixel signal output from the first correlated double sampling circuit 130a) into the first digital signal CNT1.

Each of the plurality of analog-to-digital converters 140a~140c may include a respective one of a plurality of comparators 142a, 142b, . . . , 142c and a respective one of a plurality of counters (CNTs) 144a, 144b, . . . , 144c. For example, the first analog-to-digital converter 140a may include the first comparator 142a and the first counter 144a. The first comparator 142a may compare the first analog pixel signal VP1 (e.g., the correlated double sampled first analog pixel signal output from the first correlated double sampling circuit 130a) with a ramp signal VRAMP to generate a first comparison signal CS1. The first counter 144a may count a level transition timing of the first comparison signal CS1 to generate the first digital signal CNT1. Similarly, the second analog-to-digital converter 140b may include the second comparator 142b that compares the second analog pixel signal VP2 with the ramp signal VRAMP to generate a second comparison signal CS2, and the second counter 144b that counts a level transition timing of the second comparison signal CS2 to generate the second digital signal CNT2. The Y-th analog-to-digital converter 140c may include the Y-th comparator 142c that compares the Y-th analog pixel signal VPY with the ramp signal VRAMP to generate a Y-th comparison signal CSY, and the Y-th counter 144c that counts a level transition timing of the Y-th comparison signal CSY to generate the Y-th digital signal CNTY.

The output block 150 includes a plurality of output circuits (OCs) 150a, 150b, . . . , 150c. The plurality of output circuits 150a~150c are connected to the plurality of analog-to-digital converters 140a~140c and control output timings of the plurality of digital signals CNT1~CNTY to output the plurality of digital signals CNT1~CNTY as a plurality of output signals OS1, OS2, . . . , OSY.

Each of the plurality of digital signals CNT1~CNTY is an N-bit digital signal, and each of the plurality of output circuits 150a~150c is connected to two or more output lines to simultaneously output two or more bits among N bits of a digital signal to be output, where N is a natural number greater than or equal to two.

For example, the first output circuit 150a may be connected to the first analog-to-digital converter 140a, may control an output timing of the first digital signal CNT1 to output the first digital signal CNT1 as the first output signal OS1, and may be connected to two or more output lines OL1 to output two or more bits of the first digital signal CNT1 simultaneously or concurrently (e.g., at once). Similarly, the second output circuit 150b may be connected to the second analog-to-digital converter 140b, may control an output timing of the second digital signal CNT2 to output the second digital signal CNT2 as the second output signal OS2, and may be connected to two or more output lines OL2 to output two or more bits of the second digital signal CNT2 simultaneously or concurrently (e.g., at once). The Y-th output circuit 150c may be connected to the Y-th analog-to-digital converter 140c, may control an output timing of the Y-th digital signal CNTY to output the Y-th digital signal CNTY as the Y-th output signal OSY, and may be connected to two or more output lines OLY to output two or more bits of the Y-th digital signal CNTY simultaneously or concurrently (e.g., at once). In other words, each column may include a plurality of output lines or a plurality of channels, the plurality of output lines or the plurality of channels may not be shared by different or adjacent columns, and output lines or channels in one column may be physically separate, independent, and distinct from output lines or channels in another column.

Operations of the correlated double sampling block 130, the analog-to-digital conversion block 140, and the output block 150 may be performed on the plurality of unit pixels PX included in the pixel array 110 row by row. For example, the correlated double sampling operation, the analog-to-digital conversion operation, and the operation of controlling the output timings may be performed on the analog pixel signals VP1~VPY that are generated from the unit pixels PX connected to the first row RW1, and then the correlated double sampling operation, the analog-to-digital conversion operation, and the operation of controlling the output timings may be sequentially repeated on the analog pixel signals VP1~VPY that are generated from the unit pixels PX connected to the second row RW2 through the analog pixel signals VP1~VPY that are generated from the unit pixels PX connected to the X-th row RWX. The output signals OS1~OSY corresponding to the first row RW1 through the output signals OS1~OSY corresponding to the X-th row RWX may be sequentially output. In other words, output signals OS output from the image sensor 100 at a given time may correspond to signals generated from a single row of the pixel array 110.

The ramp signal generator 160 may generate the ramp signal VRAMP. The enable signal generator 170 may generate a plurality of read enable signals RD_EN.

The timing controller 180 may control overall operation timings of the image sensor 100. For example, the timing controller 180 may control operations of the row driver 120, the ramp signal generator 160, the enable signal generator 170, etc. and may generate control signals including a count enable signal CNT_EN, a clock signal, etc.

In exemplary embodiments of the inventive concept, as will be described with reference to FIGS. 3 through 6, an analog operation performed by the analog-to-digital conversion block 140 and a data transmission operation performed by the output block 150 may not overlap each other.

Figure 2:
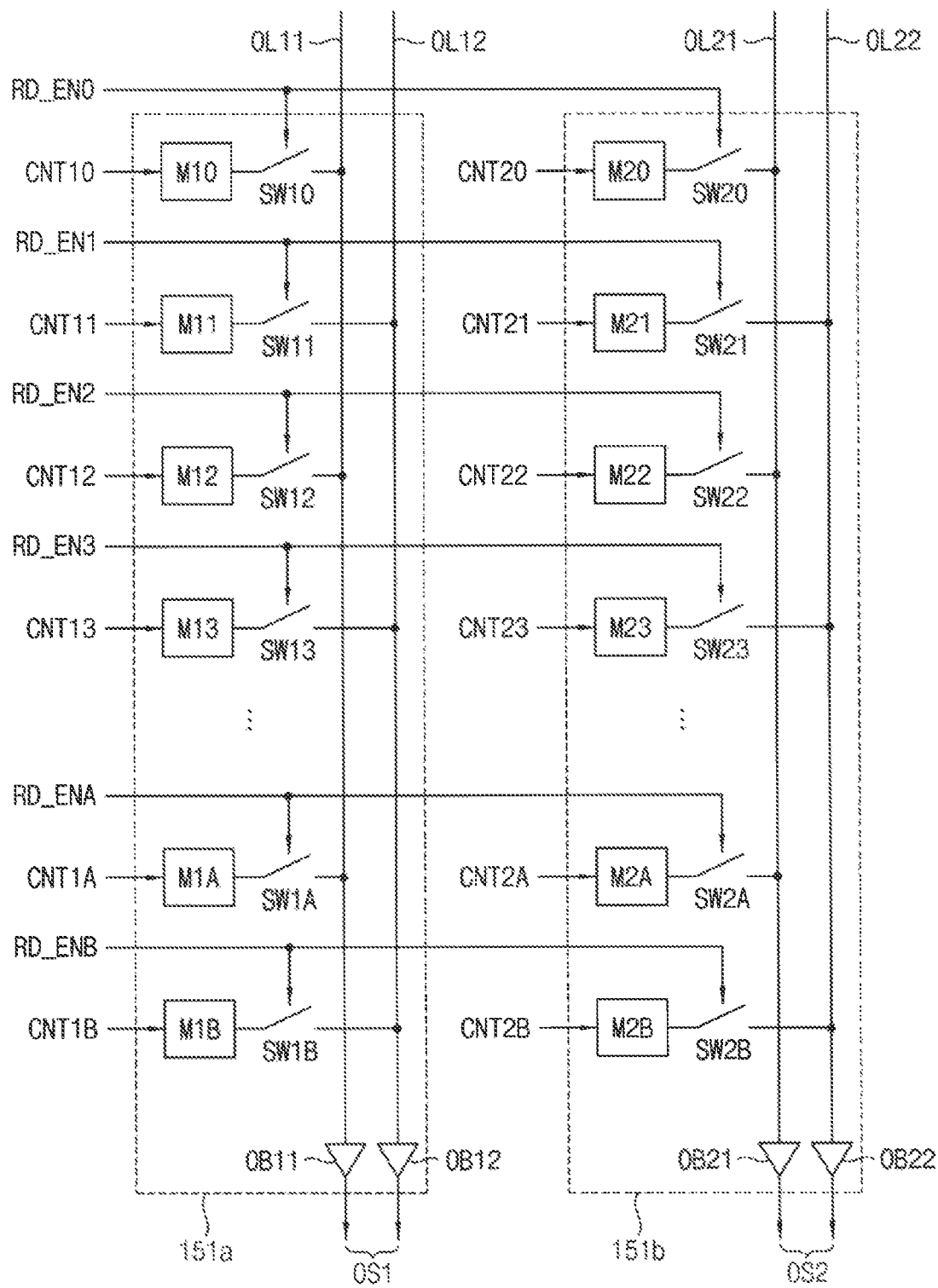
FIG. 2 is a block diagram illustrating an output block included in an image sensor according to an exemplary embodiment of the inventive concept.

FIG. 2 is a block diagram illustrating an output block included in an image sensor according to an exemplary embodiment of the inventive concept.

For convenience of illustration, FIG. 2 illustrates only first and second output circuits included in an output block. In addition, the first and second output circuits are illustrated in FIG. 2 based on an example where each of the first and second digital signals CNT1 and CNT2 output from the first and second analog-to-digital converters 140a and 140b in FIG. 1 is a 12-bit digital signal (e.g., an example where N=12 in FIG. 1).

Referring to FIGS. 1 and 2, a first output circuit 151a may include first through twelfth memories M10, M11, M12, M13, . . . , M1A, and M1B, first and second output lines OL11 and OL12, and first through twelfth switches SW10, SW11, SW12, SW13, . . . , SW1A, and SW1B. The first output circuit 151a may further include first and second output buffers OB11 and OB12. The first output circuit 151a in FIG. 2 may be an example of the first output circuit 150a in FIG. 1.

The first through twelfth memories M10~M1B may store first through twelfth bits CNT10, CNT11, CNT12, CNT13, . . . , CNT1A, and CNT1B of the first digital signal CNT1 that is output from the first analog-to-digital converter 140a connected to the first column CL1. For example, the first memory M10 may store the first bit CNT10 of the first digital signal CNT1, and the second memory M11 may store the second bit CNT11 of the first digital signal CNT1.

The first and second output lines OL11 and OL12 may simultaneously output two bits among the first through twelfth bits CNT10~CNT1B of the first digital signal CNT1. For example, the first and second output lines OL11 and OL12 may simultaneously output the first and second bits CNT10 and CNT11 of the first digital signal CNT1. The first and second output lines OL11 and OL12 in FIG. 2 may be included in the output lines OL1 in FIG. 1.

The first through twelfth switches SW10~SW1B may control connections between the first through twelfth memories M10~M1B and the first and second output lines OL11 and OL12 in response to first through twelfth read enable signals RD_EN0, RD_EN1, RD_EN2, RD_EN3, . . . , RD_ENA, and RD_ENB. For example, the first switch SW10 may selectively connect the first memory M10 with the first output line OL11 in response to the first read enable signal RD_EN0, and the second switch SW11 may selectively connect the second memory M11 with the second output line OL12 in response to the second read enable signal RD_EN1. The first through twelfth read enable signals RD_EN0~RD_ENB in FIG. 2 may be included in the plurality of read enable signals RD_EN in FIG. 1.

The first and second output buffers OB11 and OB12 may be connected to the first and second output lines OL11 and OL12, respectively, and may output the first digital signal CNT1 (e.g., the first output signal OS1) two bits by two bits.

A configuration of a second output circuit 151b may be substantially the same as a configuration of the first output circuit 151a. For example, the second output circuit 151b may include thirteenth through twenty-fourth memories M20, M21, M22, M23, . . . , M2A and M2B, third and fourth output lines OL21 and OL22, and thirteenth through twenty-fourth switches SW20, SW21, SW22, SW23, . . . , SW2A and SW2B. The second output circuit 151b may further include third and fourth output buffers OB21 and OB22. The second output circuit 151b in FIG. 2 may be an example of the second output circuit 150b in FIG. 1.

The thirteenth through twenty-fourth memories M20~M2B may store first through twelfth bits CNT20, CNT21, CNT22, CNT23, . . . , CNT2A, and CNT2B of the second digital signal CNT2 that is output from the second analog-to-digital converter 140b connected to the second column CL2. The third and fourth output lines OL21 and OL22 may simultaneously output two bits among the first through twelfth bits CNT20~CNT2B of the second digital signal CNT2. The thirteenth through twenty-fourth switches SW20~SW2B may control connections between the thirteenth through twenty-fourth memories M20~M2B and the third and fourth output lines OL21 and OL22 in response to the first through twelfth read enable signals RD_EN0~RD_ENB. The third and fourth output buffers OB21 and OB22 may be connected to the third and fourth output lines OL21 and OL22, respectively, and may output the second digital signal CNT2 (e.g., the second output signal OS2) two bits by two bits.

The output block (e.g., the output block 150 in FIG. 1) may further include output circuits other than the first and second output circuits 151a and 151b, and configurations of the output circuits other than the first and second output circuits 151a and 151b may be substantially the same as configurations of the first and second output circuits 151a and 151b.

In exemplary embodiments of the inventive concept, each of the first through twelfth memories M10~M1B and the thirteenth through twenty-fourth memories M20~M2B may be a memory device that stores 1-bit information or data. For example, each of the first through twelfth memories M10~M1B and the thirteenth through twenty-fourth memories M20~M2B may include a static random access memory (SRAM) or a latch.

Figure 3:
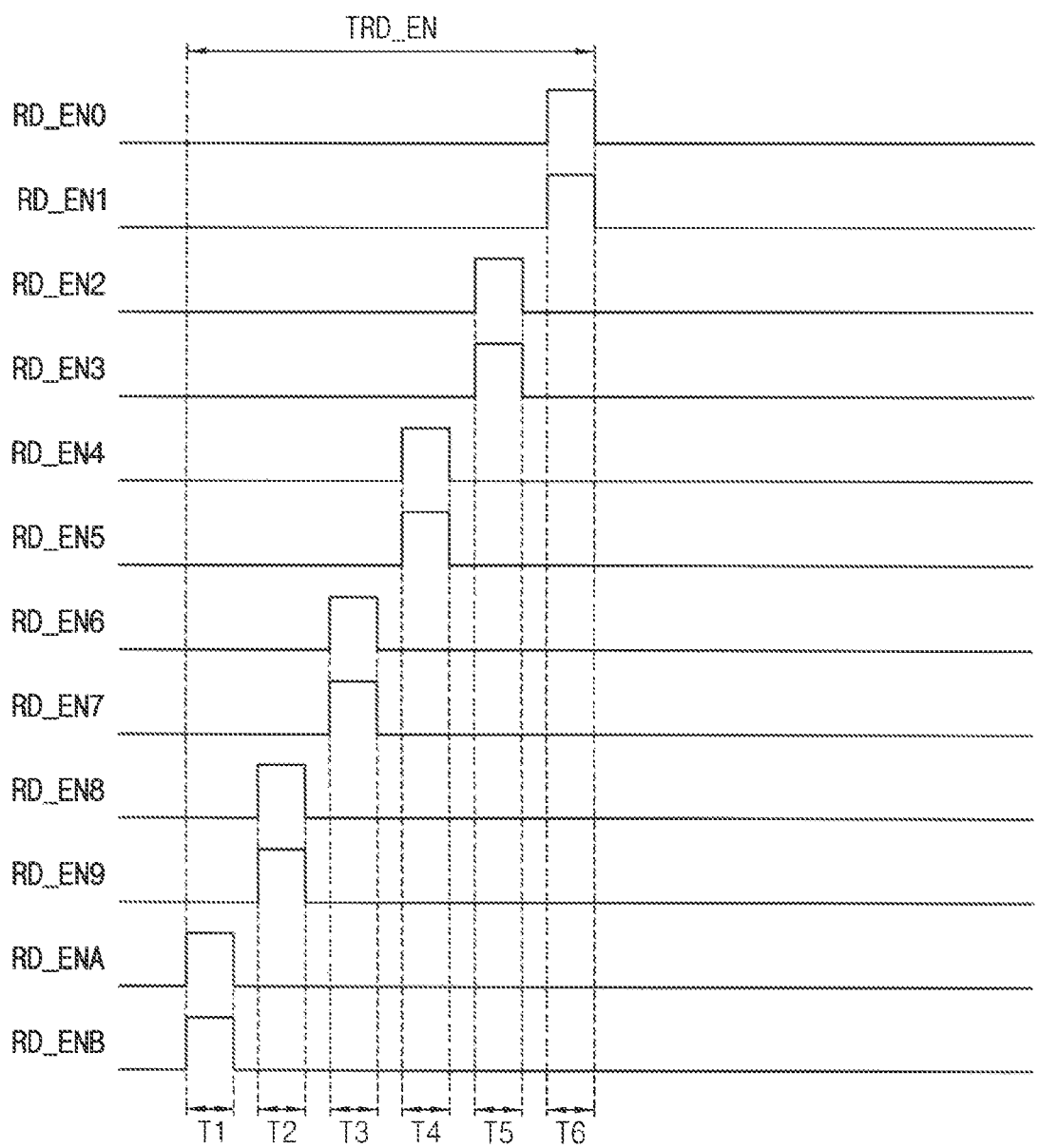
FIG. 3 is a timing diagram for describing an operation of the output block of FIG. 2 according to an exemplary embodiment of the inventive concept.

FIG. 3 is a timing diagram for describing an operation of the output block of FIG. 2 according to an exemplary embodiment of the inventive concept.

Referring to FIGS. 2 and 3, in response to controls of the first through twelfth switches SW10~SW1B in the first output circuit 151a, odd-numbered memories M10, M12, ..., M1A among the first through twelfth memories M10~M1B may be selectively connected to the first output line OL11, and even-numbered memories M11, M13, ..., M1B among the first through twelfth memories M10~M1B may be selectively connected to the second output line OL12. Similarly, in response to controls of the thirteenth through twenty-fourth switches SW20~SW2B in the second output circuit 151b, odd-numbered memories M20, M22, ..., M2A among the thirteenth through twenty-fourth memories M20~M2B may be selectively connected to the third output line OL21, and even-numbered memories M21, M23, ..., M2B among the thirteenth through twenty-fourth memories M20~M2B may be selectively connected to the fourth output line OL22. In addition, the first and second output circuits 151a and 151b may receive the same read enable signals RD_EN0~RD_ENB in common.

For example, during a time interval T1, the eleventh and twelfth read enable signals RD_ENA and RD_ENB are activated. The eleventh and twelfth switches SW1A and SW1B electrically connect the eleventh and twelfth memories M1A and M1B with the first and second output lines OL11 and OL12, respectively, and the twenty-third and twenty-fourth switches SW2A and SW2B electrically connect the twenty-third and twenty-fourth memories M2A and M2B with the third and fourth output lines OL21 and OL22, respectively, in response to the eleventh and twelfth read enable signals RD_ENA and RD_ENB. Thus, the eleventh and twelfth bits CNT1A and CNT1B of the first digital signal CNT1 stored in the eleventh and twelfth memories M1A and M1B are output simultaneously (e.g., at once) via the first and second output lines OL11 and OL12 and the first and second output buffers OB11 and OB12, and the eleventh and twelfth bits CNT2A and CNT2B of the second digital signal CNT2 stored in the twenty-third and twenty-fourth memories M2A and M2B are output simultaneously (e.g., at once) via the third and fourth output lines OL21 and OL22 and the third and fourth output buffers OB21 and OB22.

Similarly, during a time interval T2, ninth and tenth read enable signals RD_EN8 and RD_EN9 are activated, the ninth and tenth bits CNT18 and CNT19 of the first digital signal CNT1 stored in the ninth and tenth memories M18 and M19 are output simultaneously, and the ninth and tenth bits CNT28 and CNT29 of the second digital signal CNT2 stored in the twenty-first and twenty-second memories M28 and M29 are output simultaneously. During a time interval T3, seventh and eighth read enable signals RD_EN6 and RD_EN7 are activated, the seventh and eighth bits CNT16 and CNT17 of the first digital signal CNT1 stored in the seventh and eighth memories M16 and M17 are output simultaneously, and the seventh and eighth bits CNT26 and CNT27 of the second digital signal CNT2 stored in the nineteenth and twentieth memories M26 and M27 are output simultaneously. During a time interval T4, fifth and sixth read enable signals RD_EN4 and RD_EN5 are activated, the fifth and sixth bits CNT14 and CNT15 of the first digital signal CNT1 stored in the fifth and sixth memories M14 and M15 are output simultaneously, and the fifth and sixth bits CNT24 and CNT25 of the second digital signal CNT2 stored in the seventeenth and eighteenth memories M24 and M25 are output simultaneously.

During a time interval T5, the third and fourth read enable signals RD_EN2 and RD_EN3 are activated. The third and fourth switches SW12 and SW13 electrically connect the third and fourth memories M12 and M13 with the first and second output lines OL11 and OL12, respectively, and the fifteenth and sixteenth switches SW22 and SW23 electrically connect the fifteenth and sixteenth memories M22 and M23 with the third and fourth output lines OL21 and OL22, respectively, in response to the third and fourth read enable signals RD_EN2 and RD_EN3. Thus, the third and fourth bits CNT12 and CNT13 of the first digital signal CNT1 stored in the third and fourth memories M12 and M13 are output simultaneously, and the third and fourth bits CNT22 and CNT23 of the second digital signal CNT2 stored in the fifteenth and sixteenth memories M22 and M23 are output simultaneously.

During a time interval T6, the first and second read enable signals RD_EN0 and RD_EN1 are activated. The first and second switches SW10 and SW11 electrically connect the first and second memories M10 and M11 with the first and second output lines OL11 and OL12, respectively, and the thirteenth and fourteenth switches SW20 and SW21 electrically connect the thirteenth and fourteenth memories M20 and M21 with the third and fourth output lines OL21 and OL22, respectively, in response to the first and second read enable signals RD_EN0 and RD_EN1. Thus, the first and second bits CNT10 and CNT11 of the first digital signal CNT1 stored in the first and second memories M10 and M11 are output simultaneously, and the first and second bits CNT20 and CNT21 of the second digital signal CNT2 stored in the thirteenth and fourteenth memories M20 and M21 are output simultaneously.

In a conventional image sensor, each column includes a single output line or a single channel, and activation timings of a plurality of read enable signals do not overlap one another to output a single bit at once. Thus, a time required to output all bits of digital signals (e.g., a data transmission interval or data output interval) is relatively long in the conventional image sensor.

In the image sensor 100 according to an exemplary embodiment of the inventive concept, each of the plurality of output circuits 150a~150c included in the output block 150 may be connected to two or more output lines to simultaneously (e.g., at once) output two or more bits of a digital signal. In the image sensor 100 according to an exemplary embodiment of the inventive concept, each column may include a plurality of output lines or a plurality of channels, and output lines or channels in one column may be physically separate, independent, and distinct from output lines or channels in another column. In the example of FIGS. 2 and 3, two read enable signals (e.g., the read enable signals RD_EN0 and RD_EN1) may be activated simultaneously (e.g., at once), and two bits of the digital signal (e.g., the bits CNT10 and CNT11 of the first digital signal CNT1) may be output simultaneously (e.g., at once) from each column. In comparison with the conventional image sensor in which a single bit is output at once from each column, a data transmission interval TRD_EN may be reduced by about a half (e.g., ½) in the image sensor 100 according to an exemplary embodiment of the inventive concept.

Figure 4:
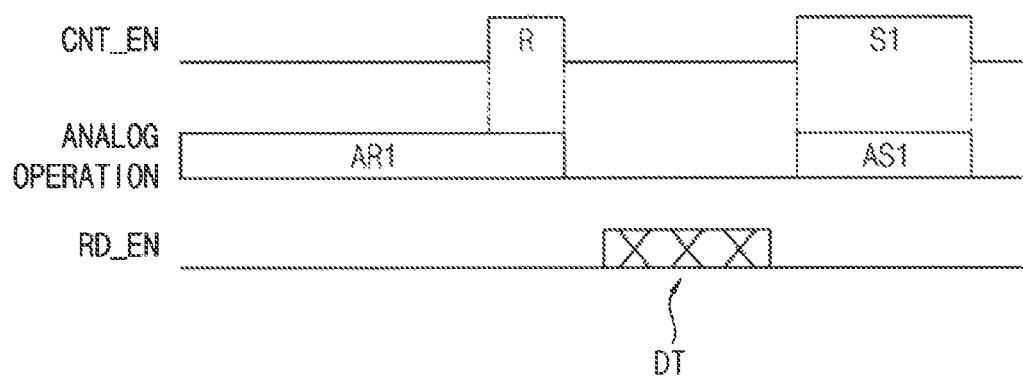
FIGS. 4, 5, and 6 are timing diagrams for describing an operation of an image sensor according to exemplary embodiments of the inventive concept.
Figure 5:
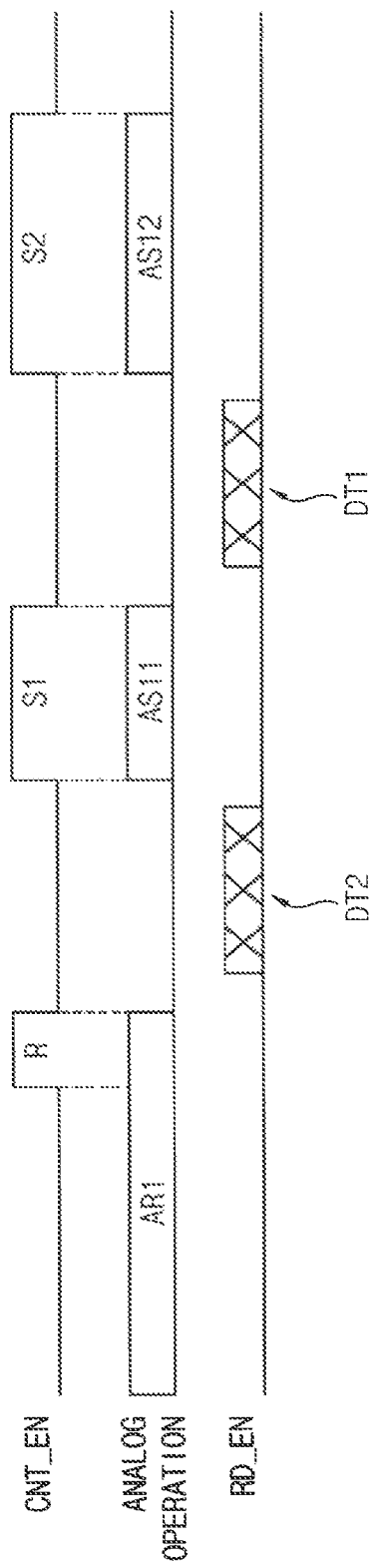
Figure 6:
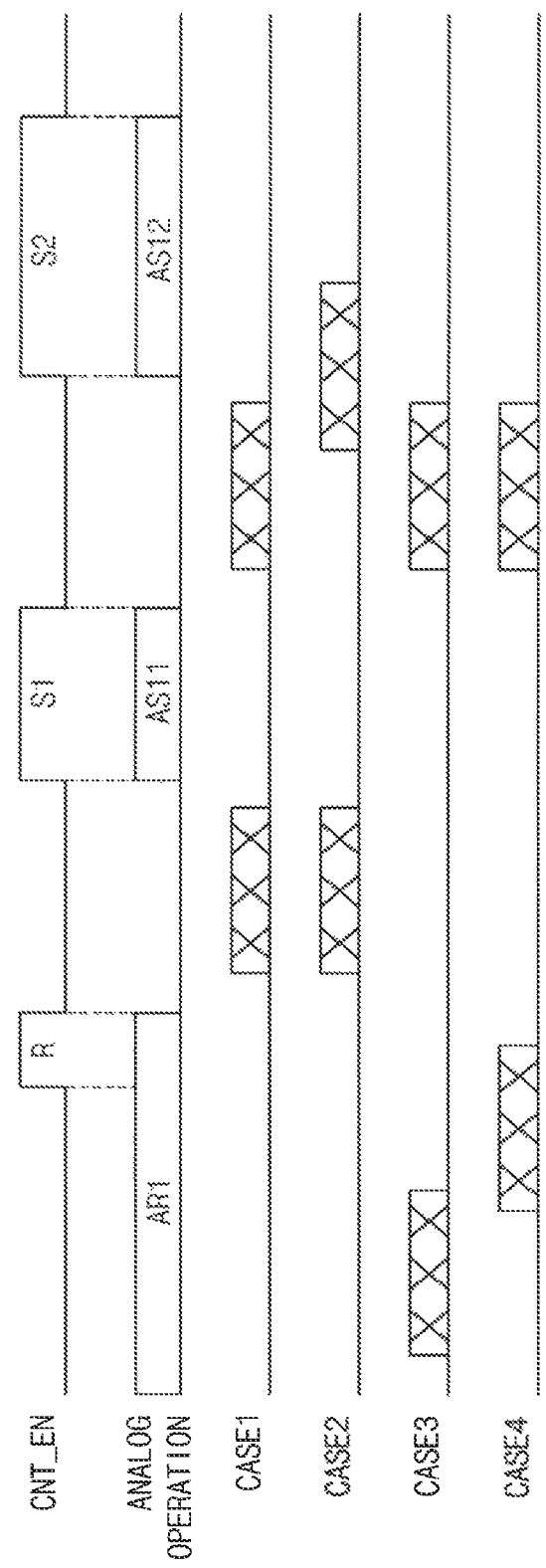

FIGS. 4, 5, and 6 are timing diagrams for describing an operation of an image sensor according to exemplary embodiments of the inventive concept.

Figure 13:
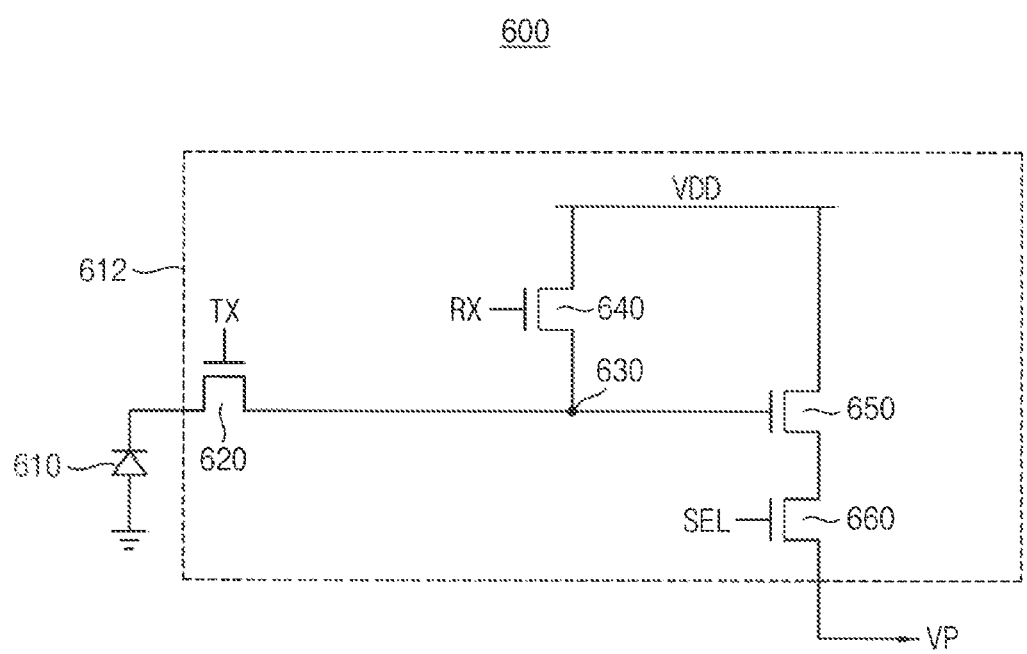
FIG. 13 is a circuit diagram illustrating a unit pixel included in an image sensor according to an exemplary embodiment of the inventive concept.

Referring to FIGS. 1 and 4, the plurality of analog pixel signals VP1~VPY output from the pixel array 110 in the image sensor 100 may include reset components R and image components (or signal components) S1. For example, each of the plurality of unit pixels PX included in the pixel array 110 may have a structure as illustrated in FIG. 13, and the reset components R and the image components S1 will be described with reference to FIG. 13.

In the image sensor 100 according to an exemplary embodiment of the inventive concept, an analog operation performed by the analog-to-digital conversion block 140 and a data transmission operation performed by the output block 150 may not overlap each other.

The analog operation may include a first analog operation AR1 extracting the reset components R and a second analog operation AS1 extracting the image components S1. For example, the reset components R of the analog pixel signals VP1~VPY that are generated from the unit pixels PX connected to a current row may be extracted by the first analog operation AR1, and the image components S1 of the analog pixel signals VP1~VPY that are generated from the unit pixels PX connected to the current row may be extracted by the second analog operation AS1. For example, the plurality of counters 144*a*~144*c* may perform count operations in response to the count enable signal CNT_EN, and the reset components R and the image components S1 may be extracted based on the count operations.

A data transmission operation DT may be performed after the first analog operation AR1 and before the second analog operation AS1. In other words, the data transmission operation DT may be performed between the first analog operation AR1 and the second analog operation AS1. The data transmission operation DT may be performed after the first analog operation AR1 is finished and before the second analog operation AS1 begins such that the data transmission operation DT does not overlap the first analog operation AR1 and the second analog operation AS1. The data transmission operation DT may represent an operation of activating the plurality of read enable signals RD_EN. For example, the data transmission operation DT may be an operation during the data transmission interval TRD_EN described with reference to FIG. 3.

In exemplary embodiments of the inventive concept, the output signals OS that are output by the data transmission operation DT by a plurality of bits (e.g., by N bits) at once may include effective image components representing differences between the image components S1 and the reset components R. Since the data transmission operation DT is performed before the second analog operation AS1 extracting the image components S1, the effective image components output by the data transmission operation DT may represent effective image components from the unit pixels PX connected to a previous row (not from the unit pixels PX connected to the current row). For example, the data transmission operation DT may not be performed between the first and second analog operations AR1 and AS1 for a first row (e.g., RW1), and the data transmission operation DT may be performed between the first and second analog operations AR1 and AS1 for a second row (e.g., RW2) to output effective image components for the first row.

Referring to FIGS. 1 and 5, the plurality of analog pixel signals VP1~VPY output from the pixel array 110 in the image sensor 100 may include the reset components R, first image components S1, and second image components S2. For example, each of the plurality of unit pixels PX included in the pixel array 110 may have a structure in which one signal generation unit is shared by two or more photoelectric conversion units.

As with the example described with reference to FIG. 4, in the image sensor 100 according to an exemplary embodiment of the inventive concept, an analog operation performed by the analog-to-digital conversion block 140 and a data transmission operation performed by the output block 150 may not overlap each other.

The analog operation may include the first analog operation AR1 extracting the reset components R, a second analog operation AS11 extracting the first image components S1, and a third analog operation AS12 extracting the second image components S2. For example, the reset components R of the analog pixel signals VP1~VPY that are generated from the unit pixels PX connected to a current row may be extracted by the first analog operation AR1, the first image components S1 of the analog pixel signals VP1~VPY that are generated from the unit pixels PX connected to the current row may be extracted by the second analog operation AS11, and the second image components S2 of the analog pixel signals VP1~VPY that are generated from the unit pixels PX connected to the current row may be extracted by the third analog operation AS12. For example, the plurality of counters 144*a*~144*c* may perform count operations in response to the count enable signal CNT_EN, and the reset components R, the first image components S1, and the second image components S2 may be extracted based on the count operations.

A first data transmission operation DT1 may be performed after the second analog operation AS11 and before the third analog operation AS12, and a second data transmission operation DT2 may be performed after the first analog operation AR1 and before the second analog operation AS11. Each of the first and second data transmission operations DT1 and DT2 may represent an operation of activating the plurality of read enable signals RD_EN (e.g., an operation during the data transmission interval TRD_EN described with reference to FIG. 3).

In exemplary embodiments of the inventive concept, the output signals OS that are output by the first data transmission operation DT1 by a plurality of bits (e.g., by N bits) at once may include first effective image components representing differences between the first image components S1 and the reset components R. Since the first data transmission operation DT1 is performed after the second analog operation AS11 extracting the first image components S1, the first effective image components output by the first data transmission operation DT1 may represent effective image components from the unit pixels PX connected to the current row. In addition, the output signals OS that are output by the second data transmission operation DT2 by a plurality of bits (e.g., by N bits) at once may include second effective image components representing differences between the second image components S2 and the reset components R. Since the second data transmission operation DT2 is performed before the third analog operation AS12 extracting the second image components S2, the second effective image components output by the second data transmission operation DT2 may represent effective image components from the unit pixels PX connected to a previous row (not from the unit pixels PX connected to the current row).

As described with reference to FIGS. 2 and 3, the conventional image sensor has a relatively long data transmission interval, and thus at least a portion of the data transmission operation (e.g., the data transmission operation DT in FIG. 4 or the data transmission operations DT1 and DT2 in FIG. 5) overlaps the analog operation (e.g., the analog operations AR1 and AS1 in FIG. 4 or the analog operations AR1, AS11, and AS12 in FIG. 5). As a result, dark shading or black shading characteristics are degraded in the conventional image sensor.

In the image sensor 100 according to an exemplary embodiment of the inventive concept, each of the plurality of output circuits 150a~150c included in the output block 150 may be connected to two or more output lines to simultaneously (e.g., at once) output two or more bits of a digital signal to be output, and thus the data transmission interval (e.g., the data transmission interval TRD_EN in FIG. 3) may be reduced. Since the data transmission interval is reduced, the data transmission operation (e.g., the data transmission operation DT in FIG. 4 or the data transmission operations DT1 and DT2 in FIG. 5) may not overlap the analog operation (e.g., the analog operations AR1 and AS1 in FIG. 4 or the analog operations AR1, AS11, and AS12 in FIG. 5), and the data transmission operation may not overlap the count operations performed by the plurality of counters 144a~144c. Accordingly, the degradation of dark shading or black shading characteristics may be prevented.

Referring to FIG. 6, CASE1 represents an example where the data transmission operation does not overlap the analog operation according to an exemplary embodiment of the inventive concept, and CASE2, CASE3, and CASE4 represent examples where at least a portion of the data transmission operation overlaps the analog operation in the conventional image sensor. In FIG. 6, the analog operation and an operation of the count enable signal CNT_EN may be substantially the same as operations described with reference to FIG. 5.

The dark shading or black shading characteristics may be measured at about 0.211, 0.48, 0.378, and 0.563 in CASE1, CASE2, CASE3, and CASE4, respectively. The lower measured values indicate lower unevenness of images and better dark shading or black shading characteristics. As can be seen, the degradation of dark shading or black shading characteristics may be prevented in the example where the data transmission operation does not overlap the analog operation (CASE1) according to an exemplary embodiment of the inventive concept.

Figure 7:
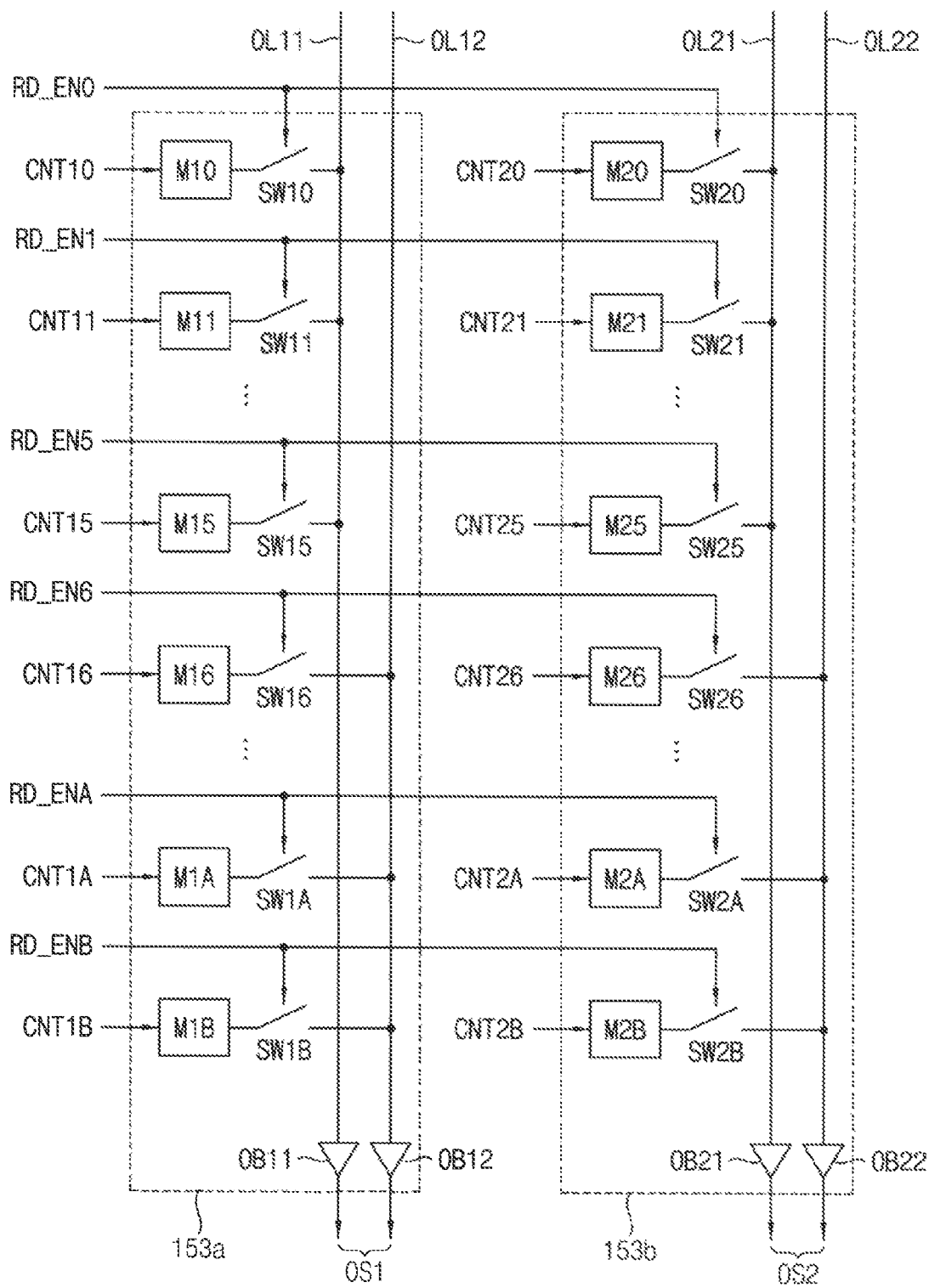
FIG. 7 is a block diagram illustrating an output block included in an image sensor according to an exemplary embodiment of the inventive concept.
Figure 8:
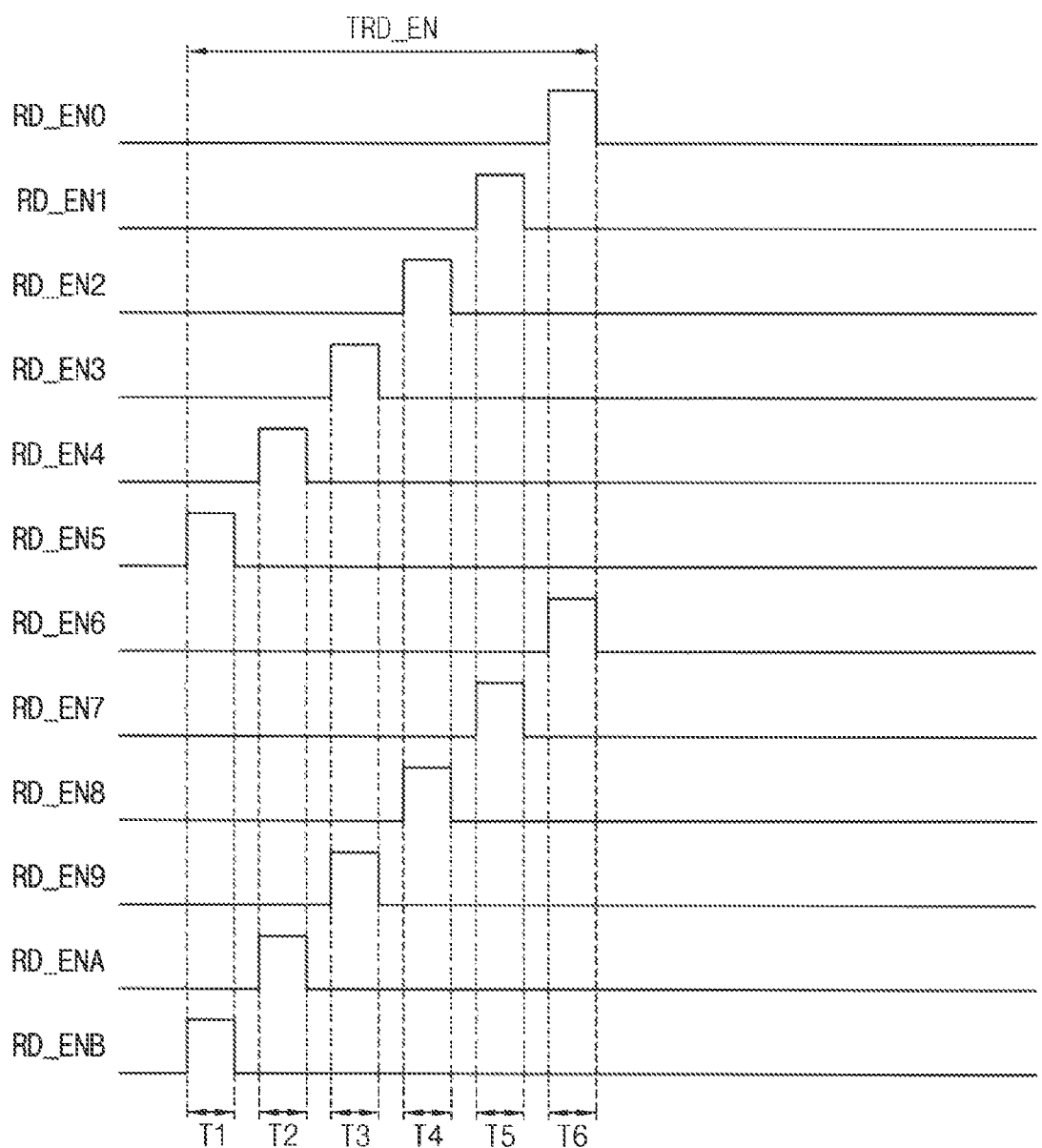
FIG. 8 is a timing diagram for describing an operation of the output block of FIG. 7 according to an exemplary embodiment of the inventive concept.

FIG. 7 is a block diagram illustrating an output block included in an image sensor according to an exemplary embodiment of the inventive concept. FIG. 8 is a timing diagram for describing an operation of the output block of FIG. 7 according to an exemplary embodiment of the inventive concept.

In comparison with the output circuits of FIGS. 2 and 3, connections between memories and output lines may be changed in output circuits of FIGS. 7 and 8. Repeat descriptions may be omitted.

Referring to FIGS. 1, 7, and 8, a first output circuit 153a may include the first through twelfth memories M10, M11, . . . , M15, M16, . . . , M1A, and M1B, the first and second output lines OL11 and OL12, and the first through twelfth switches SW10, SW11, . . . , SW15, SW16, . . . , SW1A, and SW1B, and may further include the first and second output buffers OB11 and OB12. The first output circuit 153a in FIG. 7 may be another example of the first output circuit 150a in FIG. 1.

The first through twelfth memories M10-M1B may store the first through twelfth bits CNT10, CNT11, . . . , CNT15, CNT16, . . . , CNT1A, and CNT1B of the first digital signal CNT1. The first through twelfth switches SW10-SW1B may control connections between the first through twelfth memories M10~M1B and the first and second output lines OL11 and OL12 in response to the first through twelfth read enable signals RD_EN0, RD_EN1, . . . , RD_EN5, RD_EN6, . . . , RD_ENA, and RD_ENB. For example, the first switch SW10 may selectively connect the first memory M10 with the first output line OL11 in response to the first read enable signal RD_EN0, and the seventh switch SW16 may selectively connect the seventh memory M16 with the second output line OL12 in response to the seventh read enable signal RD_EN6.

A second output circuit 153b may include the thirteenth through twenty-fourth memories M20, M21, . . . , M25, M26, . . . , M2A, and M2B, the third and fourth output lines OL21 and OL22, and the thirteenth through twenty-fourth switches SW20, SW21, . . . , SW25, SW26, . . . , SW2A, and SW2B, and may further include the third and fourth output buffers OB21 and OB22. The second output circuit 153b in FIG. 7 may be another example of the second output circuit 150b in FIG. 1.

The thirteenth through twenty-fourth memories M20~M2B may store the first through twelfth bits CNT20, CNT21, . . . , CNT25, CNT26, . . . , CNT2A, and CNT2B of the second digital signal CNT2. The thirteenth through twenty-fourth switches SW20~SW2B may control connections between the thirteenth through twenty-fourth memories M20~M2B and the third and fourth output lines OL21 and OL22 in response to the first through twelfth read enable signals RD_EN0~RD_ENB.

In response to controls of the first through twelfth switches SW10~SW1B in the first output circuit 153a, the first through sixth memories M10~M15 among the first through twelfth memories M10~M1B may be selectively connected to the first output line OL11, and the seventh through twelfth memories M16~M1B among the first through twelfth memories M10~M1B may be selectively connected to the second output line OL12. Similarly, in response to controls of the thirteenth through twenty-fourth switches SW20~SW2B in the second output circuit 153b, the thirteenth through eighteenth memories M20~M25 among the thirteenth through twenty-fourth memories M20~M2B may be selectively connected to the third output line OL21, and the nineteenth though twenty-fourth memories M26~M2B among the thirteenth through twenty-fourth memories M20~M2B may be selectively connected to the fourth output line OL22.

For example, during the time interval T1, the sixth and twelfth read enable signals RD_EN5 and RD_ENB are activated, the sixth and twelfth bits CNT15 and CNT1B of the first digital signal CNT1 stored in the sixth and twelfth memories M15 and M1B are output simultaneously, and the sixth and twelfth bits CNT25 and CNT2B of the second digital signal CNT2 stored in the eighteenth and twenty-fourth memories M25 and M2B are output simultaneously. Similarly, the fifth and eleventh read enable signals RD_EN4 and RD_ENA are activated during the time interval T2, the fourth and tenth read enable signals RD_EN3 and RD_EN9 are activated during the time interval T3, the third and ninth read enable signals RD_EN2 and RD_EN8 are activated during the time interval T4, the second and eighth read enable signals RD_EN1 and RD_EN7 are activated during the time interval T5, the first and seventh read enable signals RD_EN0 and RD_EN6 are activated during the time interval T6, and a corresponding two bits of the first digital signal CNT1 and a corresponding two bits of the second digital signal CNT2 are output simultaneously during each time interval.

The connections between the memories and the output lines, and the activation timings of the first through twelfth read enable signals RD_EN0~RD_ENB are not limited to the examples described with reference to FIGS. 2, 3, 7, and 8. For example, the inventive concept may be applied to various exemplary embodiments where one memory is connected to one output line in each output circuit, another memory is connected to another output line in each output circuit, and two bits of one digital signal are output simultaneously during each time interval.

Figure 9:
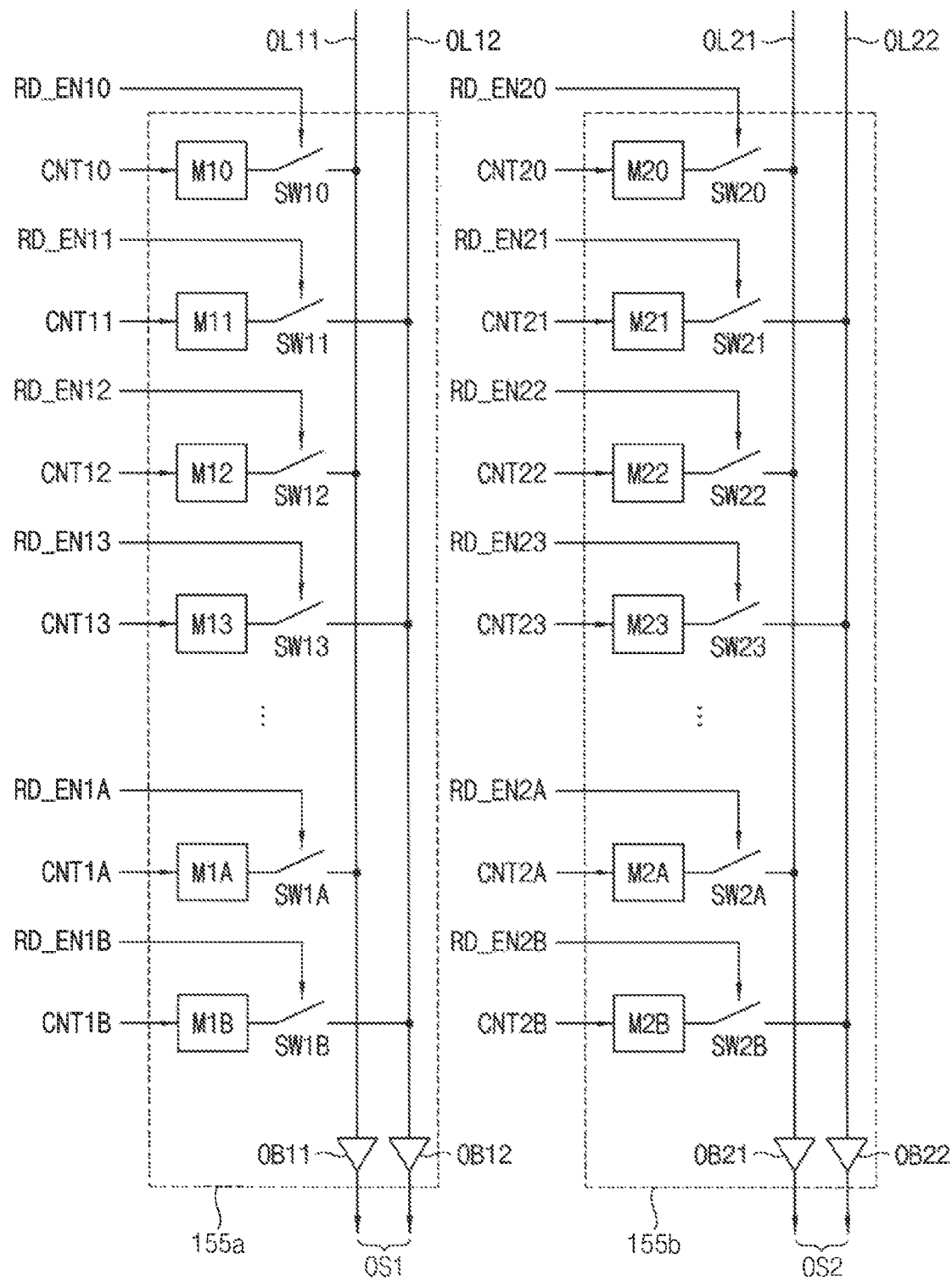
FIG. 9 is a block diagram illustrating an output block included in an image sensor according to an exemplary embodiment of the inventive concept.
Figure 10:
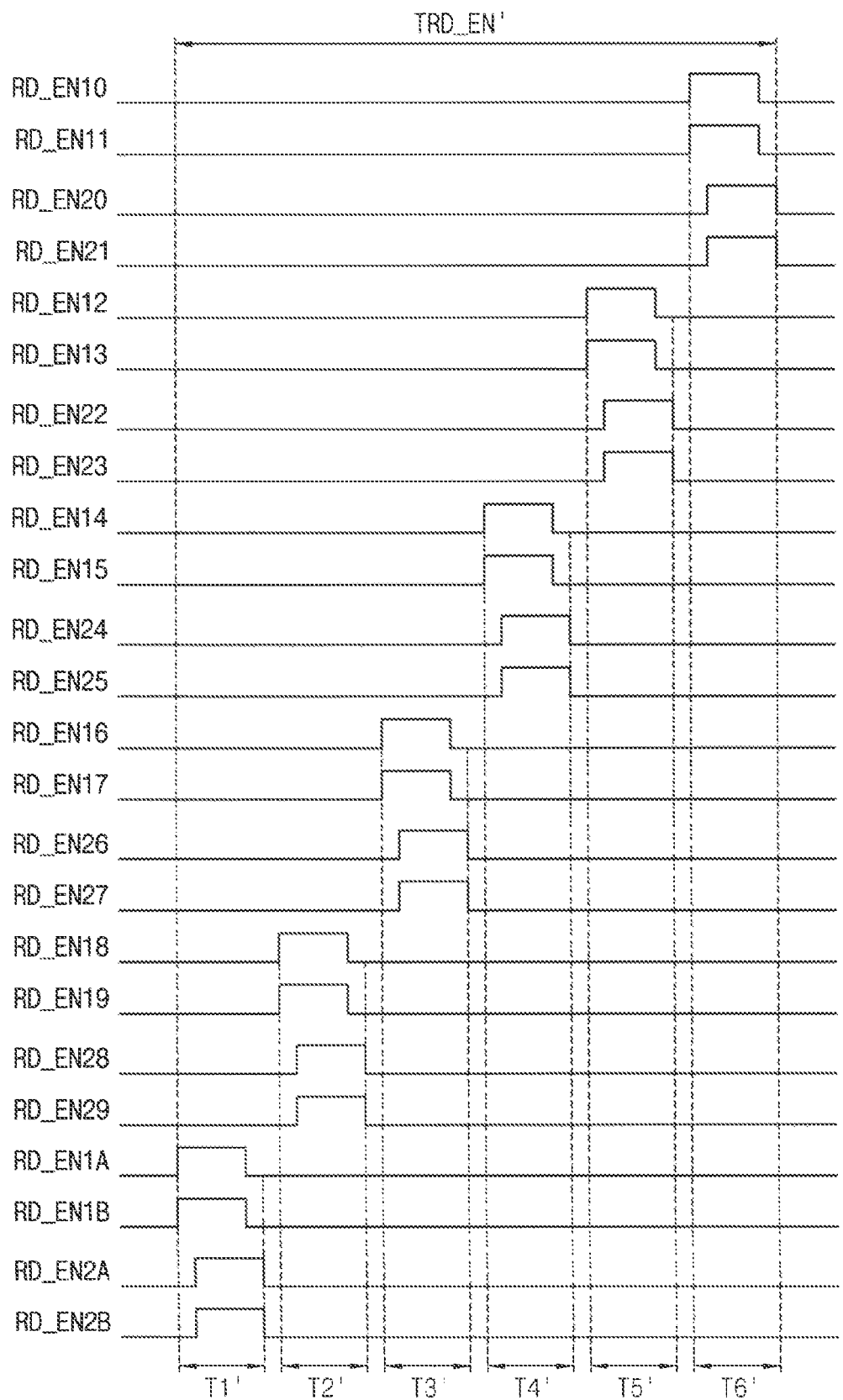
FIG. 10 is a timing diagram for describing an operation of the output block of FIG. 9 according to an exemplary embodiment of the inventive concept.

FIG. 9 is a block diagram illustrating an output block included in an image sensor according to an exemplary embodiment of the inventive concept. FIG. 10 is a timing diagram for describing an operation of the output block of FIG. 9 according to an exemplary embodiment of the inventive concept.

In comparison with the output circuits of FIGS. 2 and 3, a configuration of read enable signals may be changed in output circuits of FIGS. 9 and 10. Repeat descriptions may be omitted.

Referring to FIGS. 1, 9, and 10, a first output circuit 155a may include the first through twelfth memories M10~M1B, the first and second output lines OL11 and OL12, and the first through twelfth switches SW10~SW1B, and may further include the first and second output buffers OB11 and OB12. A second output circuit 155b may include the thirteenth through twenty-fourth memories M20~M2B, the third and fourth output lines OL21 and OL22, and the thirteenth through twenty-fourth switches SW20~SW2B, and may further include the third and fourth output buffers OB21 and OB22. The first and second output circuits 155a and 155b in FIG. 9 may be still another example of the first and second output circuits 150a and 150b in FIG. 1, respectively.

The first through twelfth switches SW10~SW1B may control connections between the first through twelfth memories M10~M1B and the first and second output lines OL11 and OL12 in response to first through twelfth read enable signals RD_EN10, RD_EN11, RD_EN12, RD_EN13, ..., RD_EN1A, and RD_EN1B. For example, the first switch SW10 may selectively connect the first memory M10 with the first output line OL11 in response to the first read enable signal RD_EN10, and the second switch SW11 may selectively connect the second memory M11 with the second output line OL12 in response to the second read enable signal RD_EN11. The first through twelfth read enable signals RD_EN10~RD_EN1B in FIG. 9 may be included in the plurality of read enable signals RD_EN in FIG. 1.

The thirteenth through twenty-fourth switches SW20~SW2B may control connections between the thirteenth through twenty-fourth memories M20~M2B and the third and fourth output lines OL21 and OL22 in response to thirteenth through twenty-fourth read enable signals RD_EN20, RD_EN21, RD_EN22, RD_EN23, ..., RD_EN2A, and RD_EN2B that are different from the first through twelfth read enable signals RD_EN10~RD_EN1B. For example, the thirteenth switch SW20 may selectively connect the thirteenth memory M20 with the third output line OL21 in response to the thirteenth read enable signal RD_EN20, and the fourteenth switch SW21 may selectively connect the fourteenth memory M21 with the fourth output line OL22 in response to the fourteenth read enable signal RD_EN21. The thirteenth through twenty-fourth read enable signals RD_EN20~RD_EN2B in FIG. 9 may be included in the plurality of read enable signals RD_EN in FIG. 1.

The first and second output circuits 155a and 155b may receive different read enable signals RD_EN10~RD_EN1B and RD_EN20~RD_EN2B independently. Different activation timings may be set for the read enable signals RD_EN10~RD_EN1B and RD_EN20~RD_EN2B, different output timings may be set for the first and second output signals OS1 and OS2 during the same time interval, and thus an output peak current at output terminals of the image sensor 100 may be distributed.

For example, during a time interval T1', the eleventh and twelfth read enable signals RD_EN1A and RD_EN1B are activated, and the eleventh and twelfth bits CNT1A and CNT1B of the first digital signal CNT1 stored in the eleventh and twelfth memories M1A and M1B are output simultaneously. In addition, during the time interval T1', the twenty-third and twenty-fourth read enable signals RD_EN2A and RD_EN2B are activated, and the eleventh and twelfth bits CNT2A and CNT2B of the second digital signal CNT2 stored in the twenty-third and twenty-fourth memories M2A and M2B are output simultaneously. In this example, start points and ending points of activation intervals of the eleventh and twelfth read enable signals RD_EN1A and RD_EN1B may be different from start points and ending points of activation intervals of the twenty-third and twenty-fourth read enable signals RD_EN2A and RD_EN2B. In other words, during the time interval T1', the activation intervals of the eleventh and twelfth read enable signals RD_EN1A and RD_EN1B may partially (not entirely) overlap the activation intervals of the twenty-third and twenty-fourth read enable signals RD_EN2A and RD_EN2B, and thus the output timings of the eleventh and twelfth bits CNT1A and CNT1B of the first digital signal CNT1 may be partially different from the output timings of the eleventh and twelfth bits CNT2A and CNT2B of the second digital signal CNT2.

Similarly, the ninth, tenth, twenty-first, and twenty-second read enable signals RD_EN18, RD_EN19, RD_EN28, and RD_EN29 are activated during a time interval T2', the seventh, eighth, nineteenth, and twentieth read enable signals RD_EN16, RD_EN17, RD_EN26, and RD_EN27 are activated during a time interval T3', the fifth, sixth, seventeenth, and eighteenth read enable signals RD_EN14, RD_EN15, RD_EN24, and RD_EN25 are activated during a time interval T4', the third, fourth, fifteenth, and sixteenth read enable signals RD_EN12, RD_EN13, RD_EN22, and RD_EN23 are activated during a time interval T5', the first, second, thirteenth, and fourteenth read enable signals RD_EN10, RD_EN11, RD_EN20, and RD_EN21 are activated during a time interval T6', and start points and ending points of activation intervals of the read enable signals applied to the first output circuit 155a may be different from start points and ending points of activation intervals of the read enable signals applied to the second output circuit 155b during each time interval.

The time intervals T1'~T6' and a data transmission interval TRD_EN' in FIG. 10 may be substantially the same as the time intervals T1~T6 and the data transmission interval TRD_EN in FIGS. 3 and 8, respectively.

Figure 11:
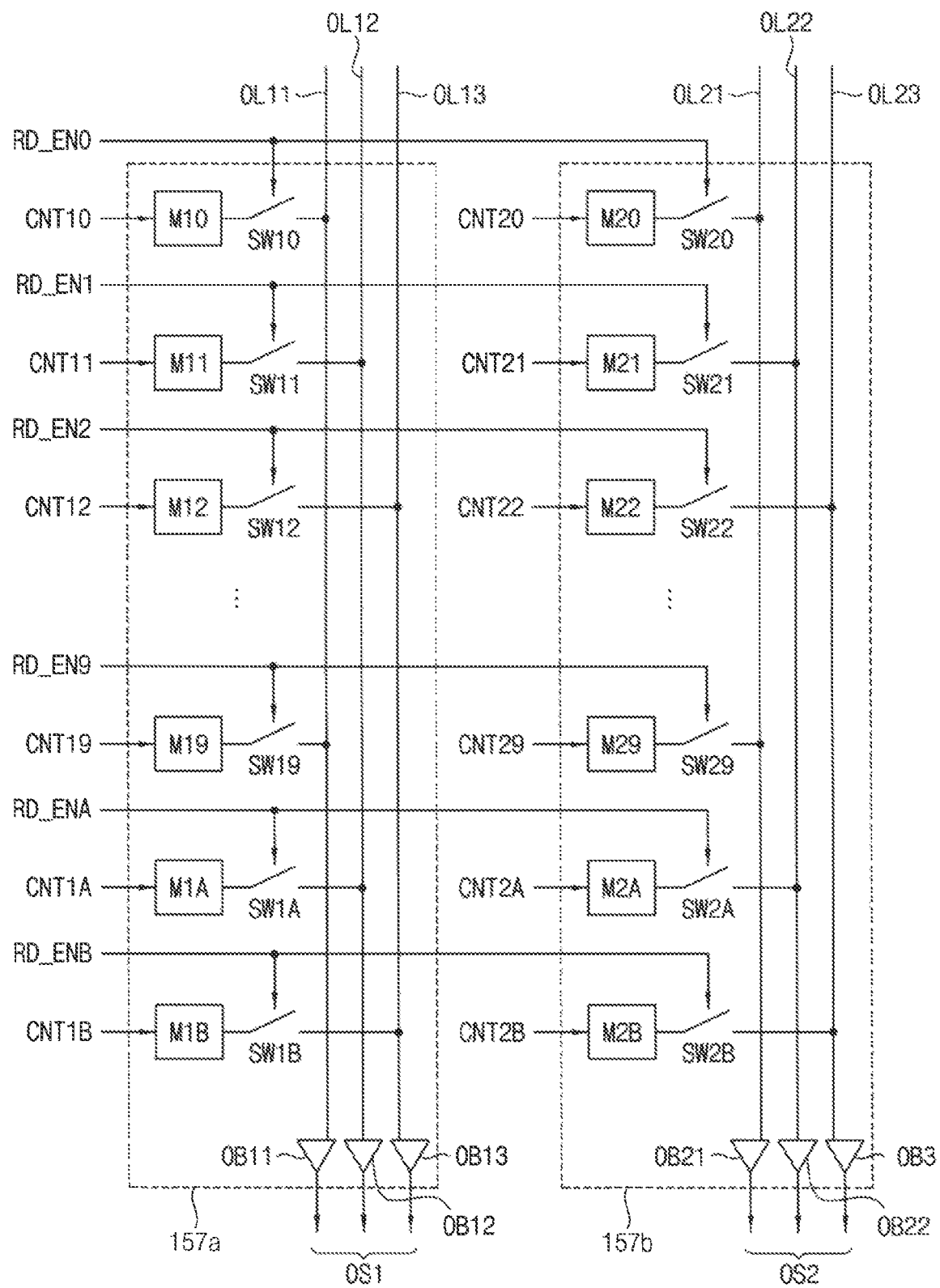
FIG. 11 is a block diagram illustrating an output block included in an image sensor according to an exemplary embodiment of the inventive concept.
Figure 12:
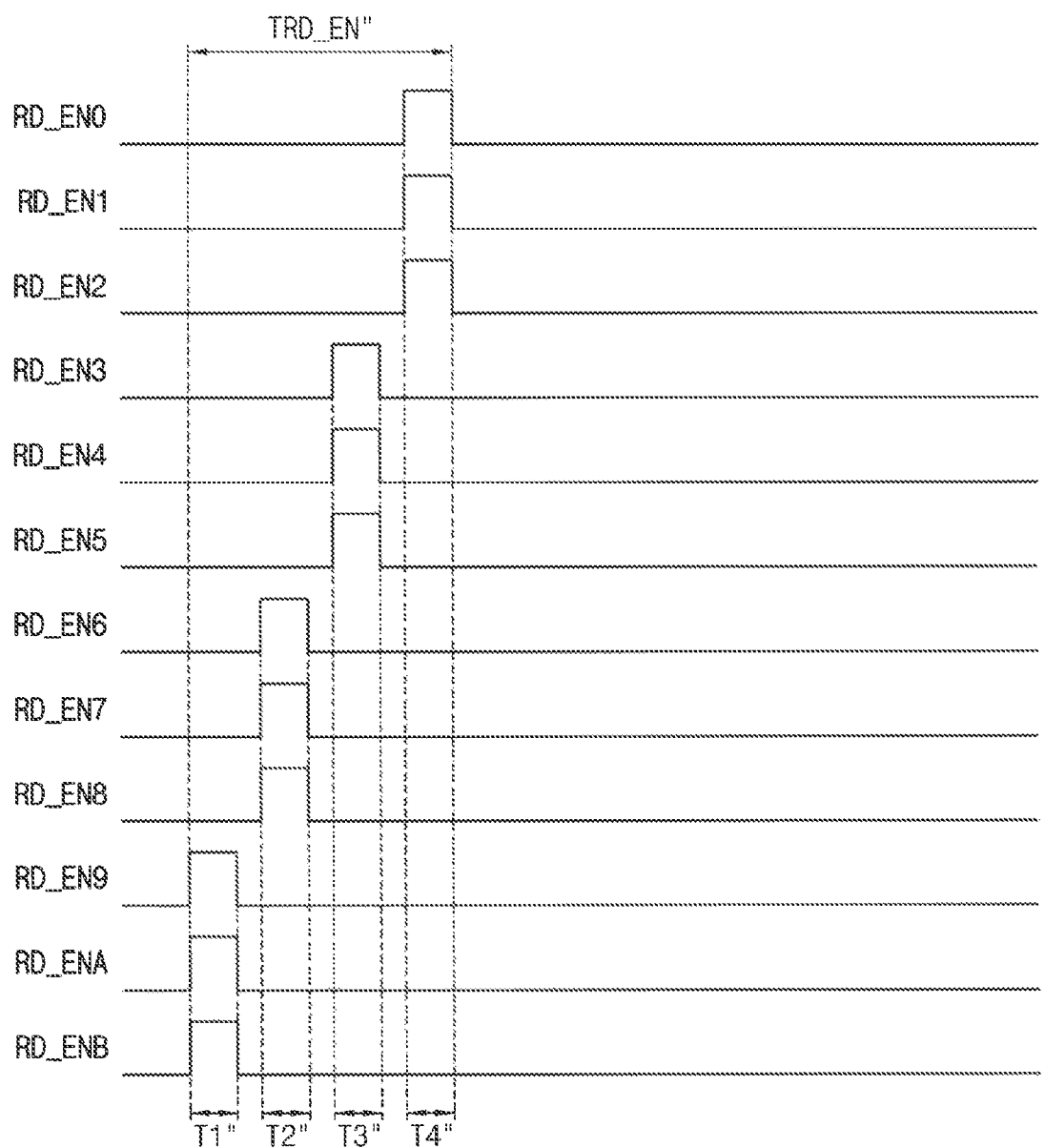
FIG. 12 is a timing diagram for describing an operation of the output block of FIG. 11 according to an exemplary embodiment of the inventive concept.

FIG. 11 is a block diagram illustrating an output block included in an image sensor according to an exemplary embodiment of the inventive concept. FIG. 12 is a timing diagram for describing an operation of the output block of FIG. 11 according to an exemplary embodiment of the inventive concept.

In comparison with the output circuits of FIGS. 2 and 3, the number of output lines may be changed in output circuits of FIGS. 11 and 12. Repeat descriptions may be omitted.

Referring to FIGS. 1, 11, and 12, a first output circuit 157a may include the first through twelfth memories M10, M11, M12, ..., M19, M1A, and M1B, first through third output lines OL11, OL12, and OL13, and the first through twelfth switches SW10, SW11, SW12, ..., SW19, SW1A, and SW1B, and may further include first through third output buffers OB11, OB12, and OB13. The first output circuit 157a in FIG. 11 may be still another example of the first output circuit 150a in FIG. 1.

The first through twelfth memories M10~M1B may store the first through twelfth bits CNT10, CNT11, CNT12, ..., CNT19, CNT1A, and CNT1B of the first digital signal CNT1. The first through third output lines OL11~OL13 may simultaneously output three bits among the first through twelfth bits CNT10~CNT1B of the first digital signal CNT1. The first through twelfth switches SW10~SW1B may control connections between the first through twelfth memories M10~M1B and the first through third output lines OL11~OL13 in response to the first through twelfth read enable signals RD_EN0, RD_EN1, RD_EN2, ..., RD_EN9, RD_ENA and RD_ENB. For example, the first switch SW10 may selectively connect the first memory M10 with the first output line OL11 in response to the first read enable signal RD_EN0, the second switch SW11 may selectively connect the second memory M11 with the second output line OL12 in response to the second read enable signal RD_EN1, and the third switch SW12 may selectively connect the third memory M12 with the third output line OL13 in response to the third read enable signal RD_EN2. The first through third output buffers OB11~OB13 may be connected to the first through third output lines OL11~OL13, respectively, and may output the first digital signal CNT1 (e.g., the first output signal OS1) three bits by three bits.

A second output circuit 157b may include the thirteenth through twenty-fourth memories M20, M21, M22, ..., M29, M2A and M2B, fourth through sixth output lines OL21, OL22 and OL23, and the thirteenth through twenty-fourth switches SW20, SW21, SW22, ..., SW29, SW2A and SW2B, and may further include fourth through sixth output buffers OB21, OB22 and OB23. The second output circuit 157b in FIG. 11 may be still another example of the second output circuit 150b in FIG. 1.

The thirteenth through twenty-fourth memories M20~M2B may store the first through twelfth bits CNT20, CNT21, CNT22, ..., CNT29, CNT2A and CNT2B of the second digital signal CNT2. The fourth through sixth output lines OL21~OL23 may simultaneously output three bits among the first through twelfth bits CNT20~CNT2B of the second digital signal CNT2. The thirteenth through twenty-fourth switches SW20~SW2B may control connections between the thirteenth through twenty-fourth memories M20~M2B and the fourth through sixth output lines OL21~OL23 in response to the first through twelfth read enable signals RD_EN0~RD_ENB. The fourth through sixth output buffers OB21~OB23 may be connected to the fourth through sixth output lines OL21~OL23, respectively, and may output the second digital signal CNT2 (e.g., the second output signal OS2) three bits by three bits.

In response to controls of the first through twelfth switches SW10~SW1B in the first output circuit 157a, (3K–2)-numbered memories M10, ..., M19 among the first through twelfth memories M10~M1B may be selectively connected to the first output line OL11, (3K–1)-numbered memories M11, ..., M1A among the first through twelfth memories M10~M1B may be selectively connected to the second output line OL12, and 3K-numbered memories M12, ..., M1B among the first through twelfth memories M10~M1B may be selectively connected to the third output line OL13, where K is a natural number. Similarly, in response to controls of the thirteenth through twenty-fourth switches SW20~SW2B in the second output circuit 157b, (3K–2)-numbered memories M20, ..., M29 among the thirteenth through twenty-fourth memories M20~M2B may be selectively connected to the fourth output line OL21, (3K–1)-numbered memories M21, ..., M2A among the thirteenth through twenty-fourth memories M20~M2B may be selectively connected to the fifth output line OL22, and 3K-numbered memories M22, ..., M2B among the thirteenth through twenty-fourth memories M20~M2B may be selectively connected to the sixth output line OL23.

For example, during a time interval T1", the tenth through twelfth read enable signals RD_EN9~RD_ENB are activated, the tenth through twelfth bits CNT19~CNT1B of the first digital signal CNT1 stored in the tenth through twelfth memories M19~M1B are output simultaneously, and the tenth through twelfth bits CNT29~CNT2B of the second digital signal CNT2 stored in the twenty-second through twenty-fourth memories M29~M2B are output simultaneously. Similarly, the seventh through ninth read enable signals RD_EN6~RD_EN8 are activated during a time interval T2", the fourth through sixth read enable signals RD_EN3~RD_EN5 are activated during a time interval T3", the first through third read enable signals RD_EN0~RD_EN2 are activated during a time interval T4", and a corresponding three bits of the first digital signal CNT1 and a corresponding three bits of the second digital signal CNT2 are output simultaneously during each time interval.

The time intervals T1"~T4" in FIG. 12 may be substantially the same as the time intervals T1~T4 in FIGS. 3 and 8, respectively, and a data transmission interval TRD_EN" in FIG. 12 may be shorter than the data transmission interval TRD_EN in FIGS. 3 and 8. In the example of FIGS. 11 and 12, three read enable signals (e.g., the read enable signals RD_EN0~RD_EN2) may be activated simultaneously (e.g., at once), and three bits of the digital signal (e.g., the bits CNT10~CNT12 of the first digital signal CNT1) may be output simultaneously (e.g., at once) from each column. In comparison with the conventional image sensor in which a single bit is output at once from each column, the data transmission interval TRD_EN" may be reduced by about a third (e.g., ⅓) in the image sensor 100 according to an exemplary embodiment of the inventive concept.

In exemplary embodiments of the inventive concept, the output circuits of FIGS. 11 and 12 may be modified according to the output circuits of FIGS. 7 and 8 or the output circuits of FIGS. 9 and 10. For example, as with the output circuits of FIGS. 7 and 8, the first through fourth memories among the first through twelfth memories M10~M1B may be selectively connected to the first output line OL11, the fifth through eighth memories among the first through twelfth memories M10~M1B may be selectively connected to the second output line OL12, and the ninth through twelfth memories among the first through twelfth memories M10~M1B may be selectively connected to the third output line OL13, in response to controls of the first through twelfth switches SW10~SW1B in the first output circuit 157a. As another example, as with the output circuits of FIGS. 9 and 10, the first and second output circuits 157a and 157b may receive different read enable signals independently.

Although the exemplary embodiments are described based on a specific number (e.g., two or three) of output lines and a specific number (e.g., twelve) of memories, the inventive concept is not limited thereto. For example, the inventive concept may be applied to various exemplary embodiments where one output circuit is connected to any multiple number of output lines to output any multiple bits of one digital signal simultaneously (e.g., at once).

FIG. 13 is a circuit diagram illustrating a unit pixel included in an image sensor according to an exemplary embodiment of the inventive concept.

Referring to FIG. 13, a unit pixel 600 may include a photoelectric conversion unit 610 and a signal generation unit 612.

The photoelectric conversion unit 610 may perform a photoelectric conversion operation. For example, the photoelectric conversion unit 610 may convert incident light into photo-charges during an integration mode. If an image sensor including the unit pixel 600 is a CMOS image sensor, image information on an object to be captured may be obtained by collecting charge carriers (e.g., electron-hole pairs) in the photoelectric conversion unit 610, proportional to an intensity of the incident light through an open shutter of the CMOS image sensor, during the integration mode.

The signal generation unit 612 may generate an electric signal (e.g., an analog pixel signal VP) based on the photo-charges generated by the photoelectric conversion operation during a readout mode. If the image sensor including the unit pixel 600 is the CMOS image sensor, the shutter may be closed, and the analog pixel signal VP may be generated based on the image information in a form of the charge carriers, during the readout mode after the integration mode. For example, as illustrated in FIG. 13, the unit pixel 600 may have a four-transistor structure including four transistors.

For example, the signal generation unit 612 may include a transfer transistor 620, a reset transistor 640, a drive transistor 650, a selection transistor 660, and a floating diffusion node 630. The transfer transistor 620 may be connected between the photoelectric conversion unit 610 and the floating diffusion node 630, and may include a gate electrode receiving a transfer signal TX. The reset transistor 640 may be connected between a power supply voltage VDD and the floating diffusion node 630, and may include a gate electrode receiving a reset signal RX. The drive transistor 650 may be connected between the power supply voltage VDD and the selection transistor 660, and may include a gate electrode connected to the floating diffusion node 630. The selection transistor 660 may be connected between the drive transistor 650 and an output terminal outputting the analog pixel signal VP, and may include a gate electrode receiving a selection signal SEL.

Hereinafter, an operation of generating the analog pixel signal VP will be described in detail. When an external light is incident onto the photoelectric conversion unit 610 during the integration mode, the photo charges are collected or generated in proportion to the amount of the incident light. During the readout mode after the integration mode, the selection signal SEL is activated, and the signal generation unit 612 is selected in response to the selection signal SEL. After that, the reset signal RX is activated, the reset transistor 640 is turned on in response to the reset signal RX, and an electric potential of the floating diffusion node 630, which is a sensing node, is reset to the power supply voltage VDD. When the reset signal RX is deactivated and the reset operation is completed, the analog pixel signal VP has a reset level corresponding to a reset state of the floating diffusion node 630. After that, the transfer signal TX is activated, the transfer transistor 620 is turned on in response to the transfer signal TX, and the photo charges accumulated in the photoelectric conversion unit 610 are transferred to the floating diffusion node 630 via the transfer transistor 620. When the transfer signal TX is deactivated and the charge transfer operation is completed, the analog pixel signal VP has an image level corresponding to the incident light (e.g., corresponding to the photo charges accumulated in the photoelectric conversion unit 610). The reset level may correspond to the reset components R described with reference to FIG. 4, and the image level may correspond to the image components S1 described with reference to FIG. 4.

One signal generation unit may be shared by a plurality of photoelectric conversion units. For example, in an example where one signal generation unit is shared by two photoelectric conversion units, the analog pixel signal may have the reset level after the reset operation is completed, may have a first image level after a first charge transfer operation is completed, and may have a second image level after a second charge transfer operation is completed. The first charge transfer operation may represent an operation where photo charges accumulated in a first photoelectric conversion unit are transferred to the floating diffusion node, and the second charge transfer operation may represent an operation where photo charges accumulated in a second photoelectric conversion unit are transferred to the floating diffusion node after the first charge transfer operation. The reset level may correspond to the reset components R described with reference to FIG. 5, the first image level may correspond to the first image components S1 described with reference to FIG. 5, and the second image level may correspond to the second image components S2 described with reference to FIG. 5.

Figure 14:
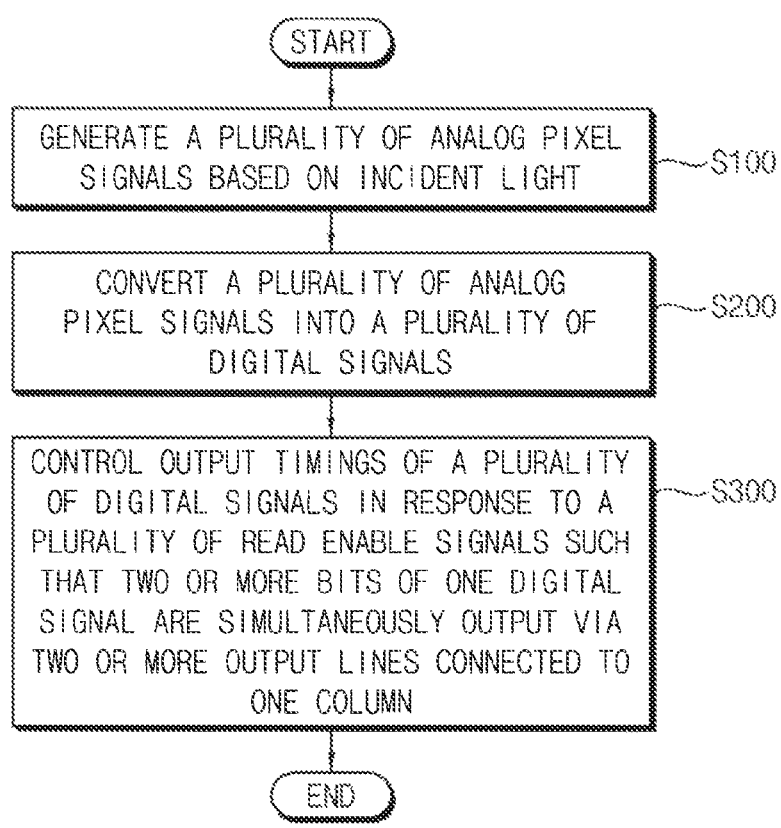
FIG. 14 is a flowchart illustrating a method of operating an image sensor according to an exemplary embodiment of the inventive concept.

FIG. 14 is a flowchart illustrating a method of operating an image sensor according to an exemplary embodiment of the inventive concept.

Referring to FIGS. 1 and 14, in a method of operating the image sensor 100 according to an exemplary embodiment of the inventive concept, the plurality of analog pixel signals VP1~VPY are generated by the pixel array 110 based on the incident light (operation S100). The plurality of analog pixel signals VP1~VPY are converted into the plurality of digital signals CNT1~CNTY by the analog-to-digital conversion block 140 (operation S200). The output timings of the plurality of digital signals CNT1~CNTY are controlled by the output block 150 in response to the plurality of read enable signals RD_EN such that two or more bits of a digital signal (e.g., the digital signal CNT1) to be output among the plurality of digital signals CNT1~CNTY are simultaneously output via two or more output lines (e.g., the output lines OL1) connected to one column (e.g., the column CL1) (operation S300).

In exemplary embodiments of the inventive concept, when each column is connected to two output lines as described with reference to FIGS. 2 through 10, two bits (e.g., the bits CNT1A and CNT1B) of the first digital signal CNT1 may be simultaneously output by the first output circuit 150a in response to activations of two read enable signals (e.g., the read enable signals RD_ENA and RD_ENB) during a first time interval (e.g., the time interval T1), and another two bits of the first digital signal CNT1 may be simultaneously output by the first output circuit 150a in response to activations of another two read enable signals (e.g., the read enable signals RD_EN8 and RD_EN9) during a second time interval (e.g., the time interval T2) subsequent to the first time interval.

In exemplary embodiments of the inventive concept, when each column is connected to three output lines as described with reference to FIGS. 11 and 12, three bits (e.g., the bits CNT19~CNT1B) of the first digital signal CNT1 may be simultaneously output by the first output circuit 157*a* in response to activations of three read enable signals (e.g., the read enable signals RD_EN9~RD_ENB) during a first time interval (e.g., the time interval T1'), and another three bits of the first digital signal CNT1 may be simultaneously output by the first output circuit 157*a* in response to activations of another three read enable signals (e.g., the read enable signals RD_EN6~RD_EN8) during a second time interval (e.g., the time interval T2") subsequent to the first time interval.

In exemplary embodiments of the inventive concept, as described with reference to FIGS. 4 and 5, the analog operation performed by the analog-to-digital conversion block 140 and the data transmission operation performed by the output block 150 may not overlap each other in the image sensor 100 according to an exemplary embodiment of the inventive concept.

Figure 15:
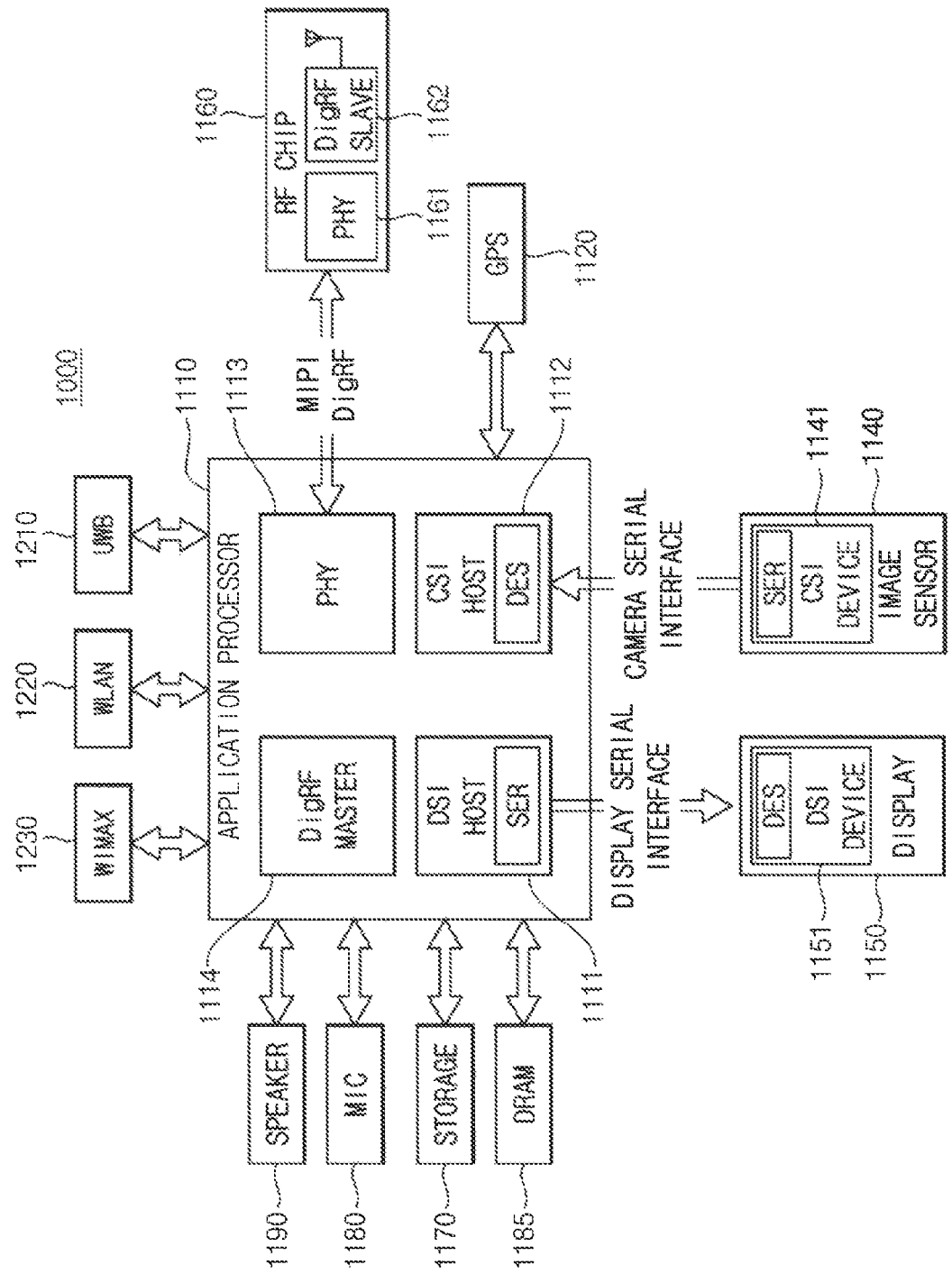
FIG. 15 is a block diagram illustrating an electronic system including an image sensor according to an exemplary embodiment of the inventive concept.

FIG. 15 is a block diagram illustrating an electronic system including an image sensor according to an exemplary embodiment of the inventive concept.

Referring to FIG. 15, an electronic system 1000 may be implemented as a data processing device that uses or supports a mobile industry processor interface (MIPI) interface. The electronic system 1000 may include an application processor 1110, an image sensor 1140, a display device 1150, etc. For example, the electronic system 1000 may further include a radio frequency (RF) chip 1160, a global positioning system (GPS) 1120, a storage 1170, a microphone (MIC) 1180, a dynamic random access memory (DRAM) 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls an operation of the image sensor 1140. The image sensor 1140 may be the above-described image sensor according to exemplary embodiments of the inventive concept.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the PHY 1161. A DigRF SLAVE 1162 of the RF chip 1160 may be controlled through the DigRF MASTER 1114.

In exemplary embodiments of the inventive concept, the DSI host 1111 may include a serializer (SER), and the DSI device 1151 may include a deserializer (DES). In exemplary embodiments of the inventive concept, the CSI host 1112 may include a deserializer (DES), and the CSI device 1141 may include a serializer (SER).

The inventive concept may be applied to various electronic devices and electronic systems including an image sensor. For example, the inventive concept may be applied to systems such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

In the image sensor according to exemplary embodiments of the inventive concept, each of the plurality of output circuits included in the output block may be connected to two or more output lines to simultaneously (e.g., at once) output two or more bits of a digital signal, and thus a time required to output all bits of digital signals (e.g., the data transmission interval or data output interval) may be reduced.

In addition, since the data transmission interval is reduced, the data transmission operation may not overlap the analog operation, and thus the degradation of dark shading or black shading characteristics may be prevented.

While the inventive concept has been particularly shown and described with reference to exemplary embodiments thereof, it will be understood by those of ordinary skill in the art that various changes in form and details may be made thereto without departing from the spirit and scope of the inventive concept as set forth by the following claims.

What is claimed is:

1. An image sensor comprising:
a pixel array including a plurality of unit pixels and configured to generate a plurality of analog pixel signals in response to incident light;
an analog-to-digital conversion block including a plurality of analog-to-digital converters that are connected to a plurality of columns of the pixel array and configured to convert the plurality of analog pixel signals into a plurality of digital signals; and
an output block including a plurality of output circuits that are connected to the plurality of analog-to-digital converters and configured to control output timings of the plurality of digital signals,
wherein each of the plurality of output circuits is connected to two or more output lines to simultaneously output two or more bits of a digital signal among the plurality of digital signals, and
wherein a first output circuit among the plurality of output circuits includes:
first through N-th memories configured to store first through N-th bits, respectively, of a first digital signal among the plurality of digital signals, where N is a natural number greater than or equal to two;
first and second output lines configured to simultaneously output two bits among the first through N-th bits of the first digital signal; and
first through N-th switches configured to control connections between the first through N-th memories and the first and second output lines in response to first through N-th read enable signals.

2. The image sensor of claim 1, wherein an analog operation performed by the analog-to-digital conversion block and a data transmission operation performed by the output block do not overlap each other.

3. The image sensor of claim 2, wherein:
the analog operation includes a first analog operation extracting reset components and a second analog operation extracting image components, and
the data transmission operation is performed after the first analog operation and before the second analog operation.

4. The image sensor of claim 2, wherein:
the analog operation includes a first analog operation extracting reset components, a second analog operation extracting first image components, and a third analog operation extracting second image components, and
the data transmission operation is performed after the first analog operation and before the second analog operation and is performed after the second analog operation and before the third analog operation.

5. The image sensor of claim 1, wherein:
odd-numbered memories among the first through N-th memories are selectively connected to the first output line in response to controls of the first through N-th switches, and
even-numbered memories among the first through N-th memories are selectively connected to the second output line in response to the controls of the first through N-th switches.

6. The image sensor of claim 1, wherein:
during a first time interval, the first and second bits of the first digital signal stored in the first and second memories are simultaneously output in response to activations of the first and second read enable signals, and
during a second time interval subsequent to the first time interval, third and fourth bits of the first digital signal stored in third and fourth memories are simultaneously output in response to activations of third and fourth read enable signals.

7. The image sensor of claim 1, wherein:
the first through (N/2)-th memories among the first through N-th memories are selectively connected to the first output line in response to controls of the first through N-th switches, and
(N/2+1)-th through N-th memories among the first through N-th memories are selectively connected to the second output line in response to the controls of the first through N-th switches.

8. The image sensor of claim 1, further comprising:
an enable signal generator configured to generate the first through N-th read enable signals.

9. The image sensor of claim 1, wherein each of the first through N-th memories includes a static random access memory (SRAM).

10. The image sensor of claim 1, wherein a second output circuit among the plurality of output circuits includes:
(N+1)-th through 2N-th memories configured to store first through N-th bits of a second digital signal among the plurality of digital signals;
third and fourth output lines configured to simultaneously output two bits among the first through N-th bits of the second digital signal; and
(N+1)-th through 2N-th switches configured to control connections between the (N+1)-th through 2N-th memories and the third and fourth output lines in response to (N+1)-th through 2N-th read enable signals different from the first through N-th read enable signals.

11. The image sensor of claim 10, wherein:
during a first time interval, the first and second bits of the first digital signal stored in the first and second memories are simultaneously output in response to activations of the first and second read enable signals,
during the first time interval, the first and second bits of the second digital signal stored in the (N+1)-th and (N+2)-th memories are simultaneously output in response to activations of the (N+1)-th and (N+2)-th read enable signals, and
activation intervals of the first and second read enable signals are different from activation intervals of the (N+1)-th and (N+2)-th read enable signals.

12. The image sensor of claim 1,
where N is a natural number greater than or equal to three, and wherein the first output circuit among the plurality of output circuits includes:
a third output line, wherein the first through third output lines are configured to simultaneously output three bits among the first through N-th bits of the first digital signal; and
first through N-th switches configured to control connections between the first through N-th memories and the first through third output lines in response to first through N-th read enable signals.

13. The image sensor of claim 12, wherein:
during a first time interval, the first through third bits of the first digital signal stored in the first through third memories are simultaneously output in response to activations of the first through third read enable signals, and
during a second time interval subsequent to the first time interval, fourth through sixth bits of the first digital signal stored in fourth through sixth memories are simultaneously output in response to activations of fourth through sixth read enable signals.

14. The image sensor of claim 1, wherein a first analog-to-digital converter among the plurality of analog-to-digital converters includes:
a first comparator configured to compare a first analog pixel signal among the plurality of analog pixel signals with a ramp signal to generate a first comparison signal; and
a first counter configured to count a level transition timing of the first comparison signal to generate a first digital signal among the plurality of digital signals.

15. The image sensor of claim 14, further comprising:
a ramp signal generator configured to generate the ramp signal.

16. An electronic system comprising:
an image sensor configured to generate a plurality of digital signals in response to incident light; and
a controller configured to control an operation of the image sensor,
wherein the image sensor comprises:
a pixel array including a plurality of unit pixels and configured to generate a plurality of analog pixel signals in response to the incident light;
an analog-to-digital conversion block including a plurality of analog-to-digital converters that are connected to a plurality of columns of the pixel array and configured to convert the plurality of analog pixel signals into the plurality of digital signals; and
an output block including a plurality of output circuits that are connected to the plurality of analog-to-digital converters and configured to control output timings of the plurality of digital signals,
wherein each of the plurality of output circuits is connected to two or more output lines to simultaneously output two or more bits of a digital signal among the plurality of digital signals,
wherein an analog operation performed by the analog-to-digital conversion block and a data transmission operation performed by the output block do not overlap each other, wherein the analog operation includes a first analog operation extracting reset components and a second analog operation extracting image components, and the data transmission operation is performed after the first analog operation and before the second analog operation.

17. A method of operating an image sensor comprising a pixel array comprising a plurality of unit pixels, the method comprising:

generating a plurality of analog pixel signals in response to incident light;

converting the plurality of analog pixel signals into a plurality of digital signals; and controlling output timings of the plurality of digital signals in response to a plurality of read enable signals such that two or more bits of a digital signal to be output among the plurality of digital signals are simultaneously output via two or more output lines connected to one column among a plurality of columns of the pixel array, wherein an analog operation in which the plurality of analog pixel signals are converted into the plurality of digital signals and a data transmission operation in which the two or more bits of the digital signal are simultaneously output via the two or more output lines do not overlap each other, wherein the analog operation includes a first analog operation extracting reset components and a second analog operation extracting image components, and the data transmission operation is performed after the first analog operation and before the second analog operation.

18. The method of claim 17, wherein controlling the output timings of the plurality of digital signals includes:

simultaneously outputting first and second bits of a first digital signal among the plurality of digital signals in response to activations of first and second read enable signals among the plurality of read enable signals during a first time interval; and simultaneously outputting third and fourth bits of the first digital signal in response to activations of third and fourth read enable signals among the plurality of read enable signals during a second time interval subsequent to the first time interval.

19. The method of claim 17, wherein controlling the output timings of the plurality of digital signals includes:

simultaneously outputting first through third bits of a first digital signal among the plurality of digital signals in response to activations of first through third read enable signals among the plurality of read enable signals during a first time interval; and simultaneously outputting fourth through sixth bits of the first digital signal in response to activations of fourth through sixth read enable signals among the plurality of read enable signals during a second time interval subsequent to the first time interval.

* * * * *